United States Patent
Lehtovirta et al.

(10) Patent No.: US 12,477,334 B2
(45) Date of Patent: Nov. 18, 2025

(54) INDICATION OF PROVISIONING PROTOCOL FOR CREDENTIALS TO ACCESS A NON-PUBLIC NETWORK

(71) Applicant: Telefonaktiebolaget LM Ericsson (publ), Stockholm (SE)

(72) Inventors: Vesa Lehtovirta, Espoo (FI); Christine Jost, Dalby (SE); Helena Vahidi Mazinani, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 277 days.

(21) Appl. No.: 18/261,214

(22) PCT Filed: Feb. 7, 2022

(86) PCT No.: PCT/EP2022/052844
§ 371 (c)(1),
(2) Date: Jul. 12, 2023

(87) PCT Pub. No.: WO2022/175126
PCT Pub. Date: Aug. 25, 2022

(65) Prior Publication Data
US 2024/0073691 A1 Feb. 29, 2024

Related U.S. Application Data

(60) Provisional application No. 63/151,284, filed on Feb. 19, 2021.

(51) Int. Cl.
*H04W 12/06* (2021.01)
*H04W 12/08* (2021.01)
(Continued)

(52) U.S. Cl.
CPC .......... *H04W 12/08* (2013.01); *H04W 12/06* (2013.01); *H04W 12/106* (2021.01); *H04L 63/0892* (2013.01); *H04W 12/71* (2021.01)

(58) Field of Classification Search
None
See application file for complete search history.

(56) References Cited

U.S. PATENT DOCUMENTS 10,764,821 B2 * 9/2020 Xiang .................. H04W 48/18
10,986,568 B1 * 4/2021 Jagannatha ............ H04W 8/24
(Continued)

OTHER PUBLICATIONS

"3GPP TR 23.700-07 V0.4.0", 3rd Generation Partnership Project; Technical Specification Group Services and System Aspects; Study on enhanced support of non-public networks (Release 17), Jun. 2020, pp. 1-159.
(Continued)

*Primary Examiner* — Tuan A Tran
(74) *Attorney, Agent, or Firm* — Weisberg I.P. Law, P.A.

(57) ABSTRACT

A method for a user equipment (UE) to obtain security credentials for accessing a non-public network (NPN) is provided. The method comprises sending, to an onboarding network (ON), a registration request that includes an identifier of the UE, and obtaining an indication of a credential provisioning protocol (CPP) used by a provisioning server (PS) for provisioning security credentials to access the NPN. The method further comprises obtaining, from the PS via the ON using the indicated CPP, security credentials for the UE to access the NPN.

19 Claims, 15 Drawing Sheets

(51) Int. Cl.
  *H04W 12/106* (2021.01)
  *H04W 48/16* (2009.01)
  *H04W 48/18* (2009.01)
  *H04L 9/40* (2022.01)
  *H04W 12/71* (2021.01)

(56) References Cited

U.S. PATENT DOCUMENTS

| | | | | |
|---|---|---|---|---|
| 11,050,631 | B2* | 6/2021 | Rooney | H04W 76/10 |
| 11,622,272 | B2* | 4/2023 | Zisimopoulos | H04W 60/00 370/329 |
| 12,015,917 | B2* | 6/2024 | Gundavelli | H04L 63/08 |
| 12,096,220 | B2* | 9/2024 | Zisimopoulos | H04W 12/069 |
| 2011/0252230 | A1* | 10/2011 | Segre | H04L 63/162 713/171 |
| 2019/0059067 | A1* | 2/2019 | Lee | H04L 67/141 |
| 2019/0223063 | A1* | 7/2019 | Palanigounder | H04W 60/005 |
| 2019/0268835 | A1* | 8/2019 | Shan | H04W 48/16 |
| 2019/0335392 | A1* | 10/2019 | Qiao | H04W 48/16 |
| 2020/0053083 | A1* | 2/2020 | Kunz | H04W 12/72 |
| 2020/0351653 | A1* | 11/2020 | Khan | H04W 12/35 |
| 2020/0389865 | A1* | 12/2020 | Kunz | H04W 8/12 |
| 2021/0058784 | A1* | 2/2021 | Kedalagudde | H04W 76/12 |
| 2021/0092707 | A1* | 3/2021 | Ryu | H04W 84/045 |
| 2021/0144593 | A1* | 5/2021 | Ahn | H04W 36/0016 |
| 2021/0211975 | A1* | 7/2021 | Prabhakar | H04W 48/16 |
| 2021/0226860 | A1* | 7/2021 | Lee | H04L 41/5009 |
| 2022/0150684 | A1* | 5/2022 | Palanigounder | H04W 12/0431 |

OTHER PUBLICATIONS

"3GPP TR 33.857 V0.3.0", 3rd Generation Partnership Project; Technical Specification Group Services and System Aspects; Study on enhanced security support for Non-Public Networks; (NPN); (Release 17), Nov. 2020, pp. 1-42.

"3GPP TS 33.501 V15.11.0", 3rd Generation Partnership Project; Technical Specification Group Services and System Aspects; Security architecture and procedures for 5G system (Release 15), Dec. 2020, pp. 1-193.

"3GPP TS 33.535 V16.1.0", 3rd Generation Partnership Project; Technical Specification Group Services and System Aspects; Authentication and Key Management for applications (AKMA) based on 3GPP credentials in the 5G System (5GS) (Release 16), Sep. 2020, pp. 1-19.

"KI#4, evaluations and conclusions update", 3GPP TSG-WG SA2 Meeting #141E e-meeting, S2-2007048, Elbonia, (revision of S2-200xxxx), Oct. 12-23, 2020, pp. 1-9.

"KI#4, Update to Solution #27", SA WG2 Meeting #S2-140E, S2-2005584r01, Electronic, Elbonia, Aug. 19-Sep. 1, 2020, pp. 1-12.

"Update to Solution #5: UE Onboarding and provisioning for an SNPN", SA WG2 Meeting #139E, S2-2004379, E-meeting, (revison of S2-2004174), Jun. 1-12, 2020, pp. 1-6.

"3GPP TS 38.401 V15.6.0", 3rd Generation Partnership Project; Technical Specification Group Radio Access Network; NG-RAN; Architecture description (Release 15), Jul. 2019, pp. 1-46.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.

* cited by examiner

INDICATION OF PROVISIONING PROTOCOL FOR CREDENTIALS TO ACCESS A NON-PUBLIC NETWORK

TECHNICAL FIELD

The present application relates generally to the field of wireless communication networks, and more specifically to provisioning of credentials that a user equipment (UE) can use when accessing a non-public network (NPN).

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases.

3GPP security working group SA3 specified the security-related features for Release 15 (Rel-15) of the 5G System (5GS) in 3GPP TS 33.501 (v. 15.11.0). In particular, the 5GS includes many new features (e.g., as compared to earlier 4G/LTE systems) that required introduction of new security mechanisms. For example, 5GS seamlessly integrates non-3GPP access (e.g., via wireless LAN) together with 3GPP access (e.g., NR and/or LTE). As such, in 5GS, a user equipment (UE, e.g., wireless device) can access services independent of underlying radio access technology (RAT).

3GPP Rel-16 also specifies support for Non-Public Networks (NPN) that are for non-public use, as described in 3GPP TS 23.501 (v. 16.7.0). An example NPN is a factory or other industrial facility that deploys its own 5GS to provide connectivity for both equipment and workers.

NPNs can be deployed as a Stand-alone Non-Public Network (SNPN) when not relying on network functions provided by a public land mobile network (PLMN). An SNPN is identified by a PLMN ID and (network ID) NID broadcast in system information block 1 (SIB1). An SNPN-capable UE supports the SNPN access mode. When the UE is set to operate in SNPN access mode, the UE only selects and registers with SNPNs. When the UE is not set to operate in SNPN access mode, the UE performs normal PLMN selection procedures. UEs operating in SNPN access mode only (re)select cells within the selected/registered SNPN and a cell can only be considered as suitable when the PLMN and NID broadcast by the cell matches the selected/registered SNPN.

Alternately, NPNs can be deployed as a Public Network Integrated (PNI) NPN when relying on functions provided by a PLMN. For PNI-NPNs, Closed Access Groups (CAGs) identify groups of subscribers who are permitted to access one or more cells associated with the CAG. A CAG is identified by a CAG identifier broadcast in SIB1. A CAG-capable UE can be configured with the following per PLMN:

Allowed CAG list containing the CAG identifiers that the UE is allowed to access; and CAG-only indication if the UE is only allowed to access 5GS via CAG cells.

The UE checks the suitability of CAG cells based on the Allowed CAG list provided by upper layers. When the UE is configured with a CAG-only indication, only CAG Member Cells can be suitable. A non-suitable cell can be acceptable though if the UE is configured with a CAG-only indication for one of the PLMN broadcast by the cell.

3GPP is also working on further enhancements to NPN for Rel-17, with the architectural study work being captured in 3GPP TRs 23.700-07 and 33.857. Among the objectives of the Rel-17 work is "UE Onboarding and remote provisioning". In general, this topic relates to the provisioning of information, to a UE and within the network, required for the UE to get authorized access and connectivity to an NPN.

The architectural work captured in 3GPP TR 23.700-07 relates to UE identification, exposure application programming interface (API), network selection, authentication, and authorization procedure for UE and SNPN. Additional details include architecture enhancements to enable provisioning of SNPN credentials for primary authentication and SNPN configurations into the UE that enable SNPN access. The security aspects captured in 3GPP TR 33.857 are primarily related to two issues: securing initial access for UE onboarding between UE and SNPN, and provisioning of credentials.

However, the current solutions described in 3GPP TRs 23.700-07 and TR 33.857 propose to keep the credential provisioning technique and/or protocol out of the scope of later 3GPP technical specifications (TS). One rationale is that there are several preferred credential provisioning techniques and/or protocols, and 3GPP should not restrict vendor flexibility by specifying only one. While this approach may provide flexibility, it also introduces interoperability problems if devices and networks support different credential provisioning techniques and/or protocols.

SUMMARY

Accordingly, exemplary embodiments of the present disclosure address these and other problems, issues, and/or difficulties that can occur when a UE attempts to access an NPN, thereby enabling the otherwise-advantageous deployment of NPNs based on 5GS.

Some embodiments of the present disclosure include methods (e.g., procedures) to obtain security credentials for accessing a non-public network (NPN). These exemplary methods can be performed by a UE (e.g., wireless device).

These exemplary methods can include sending, to an onboarding network (ON), a registration request that includes an identifier of the UE. These exemplary methods can also include obtaining an indication of a credential provisioning protocol (CPP) used by a provisioning server (PS) for provisioning security credentials to access the NPN. These exemplary methods can also include obtaining, from the PS via the ON using the indicated CPP, security credentials for the UE to access the NPN.

In some embodiments, these exemplary methods can also include deregistering from the ON and registering with the NPN using the obtained security credentials.

In some embodiments, the obtaining the indication includes receiving an indication of a PS-supported CPP from the PS or from a default credential server (DCS). In some embodiments, the DCS comprises an authentication, authorization and accounting (AAA) server.

In some embodiments, the registration request can include an indication of one or more UE-supported CPPs. In such case, the indicated CPP can be one of the UE-supported CPPs. In some embodiments, the indicated CPP can be one of the following: CMPv2, ACME, EST, SCEP, GSMA eSIM, or OMA LwM2M.

In some embodiments, the indication can be integrity-protected based on key material known to the UE and the PS.

In some embodiments, the indication can include an indication of whether the CPP is performed via control plane or user plane communications with the UE. In some embodiments, the received indication is integrity-protected based on key material known to the UE and a default credential server (DCS), or received indication is integrity-protected based on key material known to the UE and the ON.

In some embodiments, the indication can be obtained from the ON. For example, the indication can be obtained from the ON in a message of a non-access stratum security mode command (NAS SMC) procedure or in a registration accept responsive to the registration request.

Other embodiments include methods (e.g., procedures) to facilitate UE access to an NPN. These exemplary methods can be performed by an onboarding network (ON), such as by one or more network nodes or functions (e.g., AMF).

These exemplary methods can include receiving, from the UE, a registration request that includes an identifier of the UE. These exemplary methods can also include obtaining an indication of a credential provisioning protocol (CPP) used by a provisioning server (PS) for provisioning security credentials to access the NPN. These exemplary methods can also include sending the indication of the CPP to the UE. In some embodiments, these exemplary methods can also include deregistering the UE after sending the indication of the CPP.

In some embodiments, the indication can be sent to the UE in a message of a non-access stratum security mode command (NAS SMC) procedure or in a registration accept that is responsive to the registration request. In some embodiments, the indication sent to the UE can be integrity-protected based on one of the following: key material known to the UE and the PS, key material known to the UE and the DCS, and key material known to the UE and the ON.

In some embodiments, the indication obtained and sent to the UE can include an indication of whether the CPP is performed via control plane or user plane communications with the UE. In some embodiments, the indicated CPP can be one of the following: CMPv2, ACME, EST, SCEP, GSMA eSIM, or OMA LwM2M.

In some embodiments, obtaining the indication can include selecting the CPP based on one or more of the following:
- a predetermined CPP, configured in the ON;
- a CPP selection policy, configured in the ON;
- an indication of one or more UE-supported CPPs, included in the registration request; and
- an indication of one or more PS-supported CPPs, received from the PS or from a default credential server (DCS).

In other embodiments, obtaining the indication can include receiving the indication from a DCS or from the PS. In some of these embodiments, the received indication can be integrity-protected based on key material known to the UE and the PS, key material known to the UE and the DCS, or key material known to the UE and the ON. In some of these embodiments, obtaining the indication can also include sending, to the PS or to the DCS, a request for an indication of a CPP used by the PS. In such embodiments, the indication can be received from the PS or from the DCS in response to the request. In some variants, the registration request can include an indication of one or more UE-supported CPPs, the request to the PS or to the DCS also includes the indication of the one or more UE-supported CPPs, and the CPP indicated in the response to the request is one of the UE-supported CPPs.

Other embodiments include additional methods (e.g., procedures) to facilitate UE access to an NPN. These exemplary methods can be performed by a default credential server (DCS).

These exemplary methods can include receiving, from an onboarding network (ON), an authentication request that includes an identifier of the UE. These exemplary methods can also include performing a primary authentication with the UE via the ON, using an authentication method based on the identifier of the UE. These exemplary methods can also include determining a credential provisioning protocol (CPP) used by a provisioning server (PS) for provisioning security credentials to access the NPN. These exemplary methods can also include sending an indication of the CPP to the ON.

In some embodiments, the indication sent to the ON can be integrity-protected based on key material known to the UE and the PS, key material known to the UE and the DCS, or key material known to the UE and the ON. In some embodiments, the indication sent to the ON can include an indication of whether the CPP is performed via control plane or user plane communications with the UE. In some embodiments, the determined and indicated CPP can be one of the following: CMPv2, ACME, EST, SCEP, GSMA eSIM, or OMA LwM2M.

In some embodiments, the determining operations can include selecting the CPP based on one or more of the following:
- a predetermined CPP, configured in the DCS;
- a CPP selection policy, configured in the DCS;
- an indication of one or more UE-supported CPPs, included in the authentication request;
and
- an indication of one or more PS-supported CPPs, received from the PS.

In other embodiments, the determining operations can include sending, to the PS, a request for an indication of a CPP used by the PS; and receiving the indication from the PS in response to the request. In some of these embodiments, the authentication request and the request to the PS can include an indication of one or more UE-supported CPPs, and the CPP indicated in the response to the request can be one of the UE-supported CPPs.

Other embodiments include additional methods (e.g., procedures) to facilitate user equipment (UE) access to an NPN. These exemplary methods can be performed by a provisioning server (PS) for the NPN.

These exemplary methods can include determining a credential provisioning protocol (CPP) to be used by the PS for provisioning security credentials for the UE to access the NPN. These exemplary methods can also include sending an indication of the CPP to the UE. These exemplary methods can also include providing, to the UE via an onboarding network (ON) using the indicated CPP, security credentials for the UE to access the NPN.

In some embodiments, these exemplary methods can also include receiving, from the UE, a request for security credentials for the UE to access the NPN. In such embodiments, the indication can be sent in response to the request.

In some embodiments, the indication sent to the UE can be integrity-protected based on key material known to the UE and the PS, key material known to the UE and the DCS, or key material known to the UE and the ON. In some embodiments, the indication sent to the UE can include an indication of whether the CPP is performed via control plane or user plane communications with the UE. In some embodiments, the determined and indicated CPP can be one of the following: CMPv2, ACME, EST, SCEP, GSMA eSIM, or OMA LwM2M.

In some embodiments, the determining operations can include selecting the CPP based on one or more of the following:
- a predetermined CPP, configured in the PS;
- a CPP selection policy, configured in the PS;
- an indication of one or more UE-supported CPPs, included in a request received from the UE;
- one or more ON-supported CPPs, as indicated by the ON; and
- one or more CPPs supported by a default credentials server (DCS), as indicated by the DCS.

Other embodiments include UEs, ONs, DCS's, or PS's (or network nodes hosting the same) that are configured to perform the operations corresponding to any of the exemplary methods described herein. Other embodiments include non-transitory, computer-readable media storing computer-executable instructions that, when executed by processing circuitry, configure such UEs, ONs, DCS's, or PS's to perform operations corresponding to any of the exemplary methods described herein.

These and other objects, features, and advantages of the present disclosure will become apparent upon reading the following Detailed Description in view of the Drawings briefly described below.

DETAILED DESCRIPTION

Figure 1:
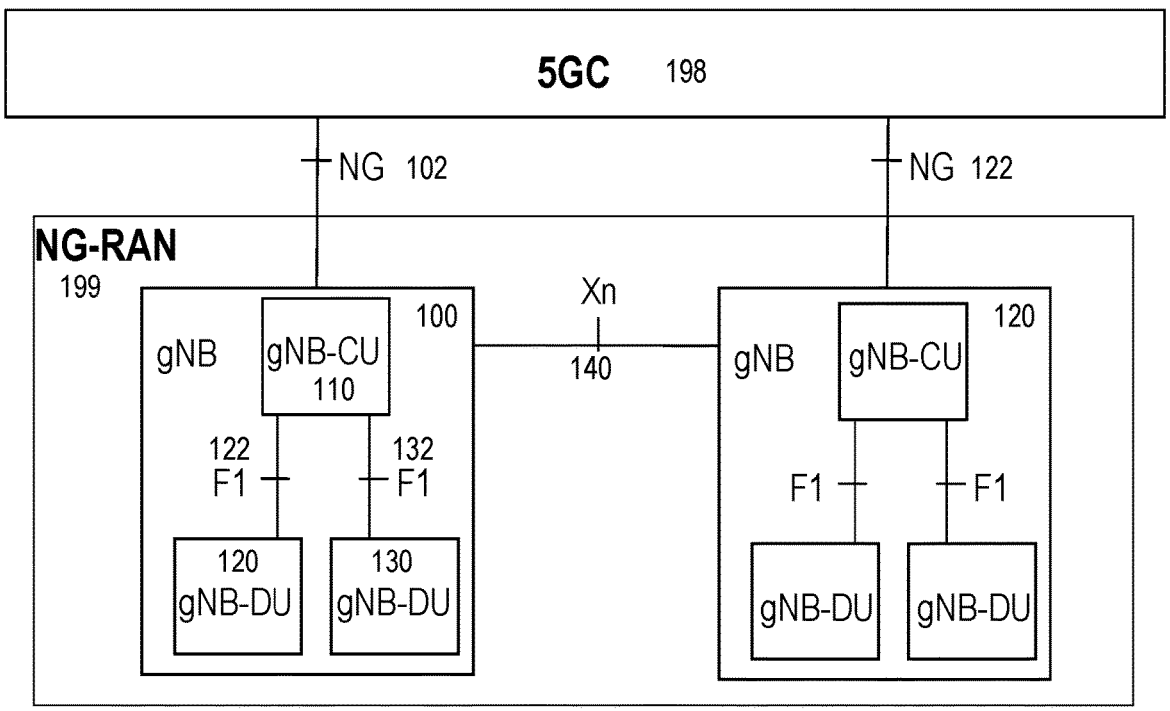
FIGS. 1-2 illustrate various aspects of an exemplary 5G network architecture.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data, associated with one or more applications, that is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0) shall be applied.

The NG RAN logical nodes shown in FIG. 1 (and described in 3GPP TS 38.401 (v15.6.0) and 3GPP TR 38.801 (v14.0.0) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5GS (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. This SBA model also adopts principles like modularity, reusability, and self-containment of NFs, which can enable deployments to take advantage of the latest virtualization and software technologies.

The services in 5GC can be stateless, such that the business logic and data context are separated. For example, the services can store their context externally in a proprietary database. This can facilitate various cloud infrastructure features like auto-scaling or auto-healing. Furthermore, 5GC services can be composed of various "service operations", which are more granular divisions of overall service functionality. The interactions between service consumers and producers can be of the type "request/response" or "subscribe/notify".

Figure 2:
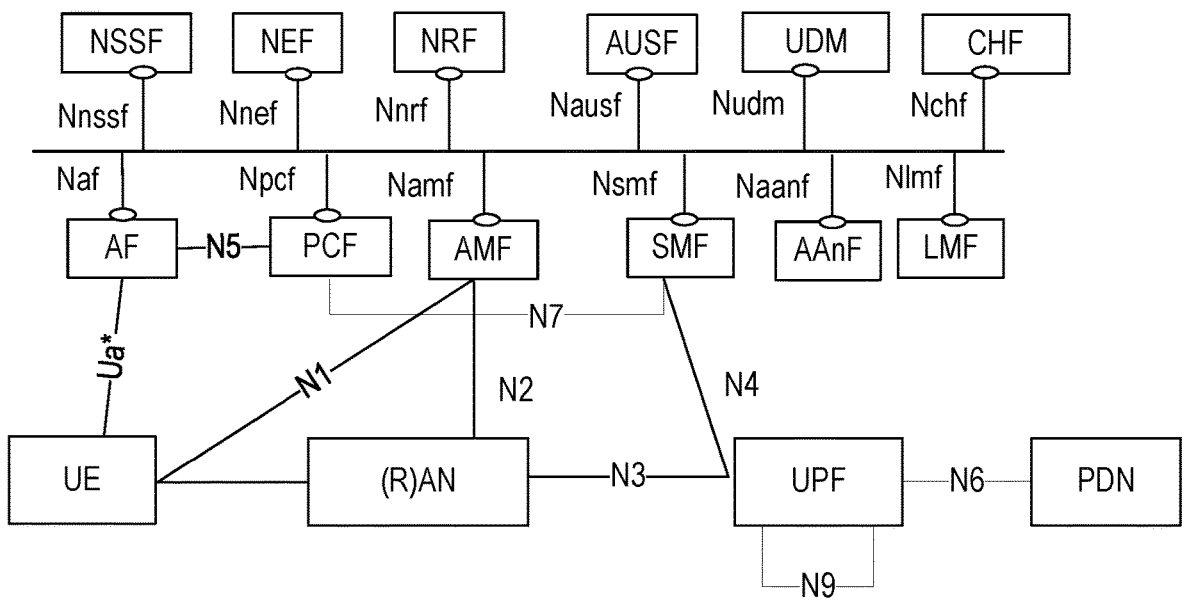

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)— supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

3GPP Rel-16 introduces a new feature called authentication and key management for applications (AKMA) that is based on 3GPP user credentials in 5G, including the Internet of Things (IoT) use case. More specifically, AKMA leverages the user's AKA (Authentication and Key Agreement) credentials to bootstrap security between the UE and an application function (AF), which allows the UE to securely exchange data with an application server. The AKMA architecture can be considered an evolution of GBA (Generic Bootstrapping Architecture) specified for 5GC in 3GPP Rel-17 and is further specified in 3GPP TS 33.535.

In addition to the NEF, AUSF, and AF shown in FIG. 2 and described above, Rel-16 AKMA also utilizes an anchor function for authentication and key management for applications (AAnF). This function is shown in FIG. 2 with Naanf interface. In general, AAnF interacts with AUSFs and maintains UE AKMA contexts to be used for subsequent bootstrapping requests, e.g., by application functions. At a high level, AAnF is similar to a bootstrapping server function (BSF) defined for GBA.

Figure 3:
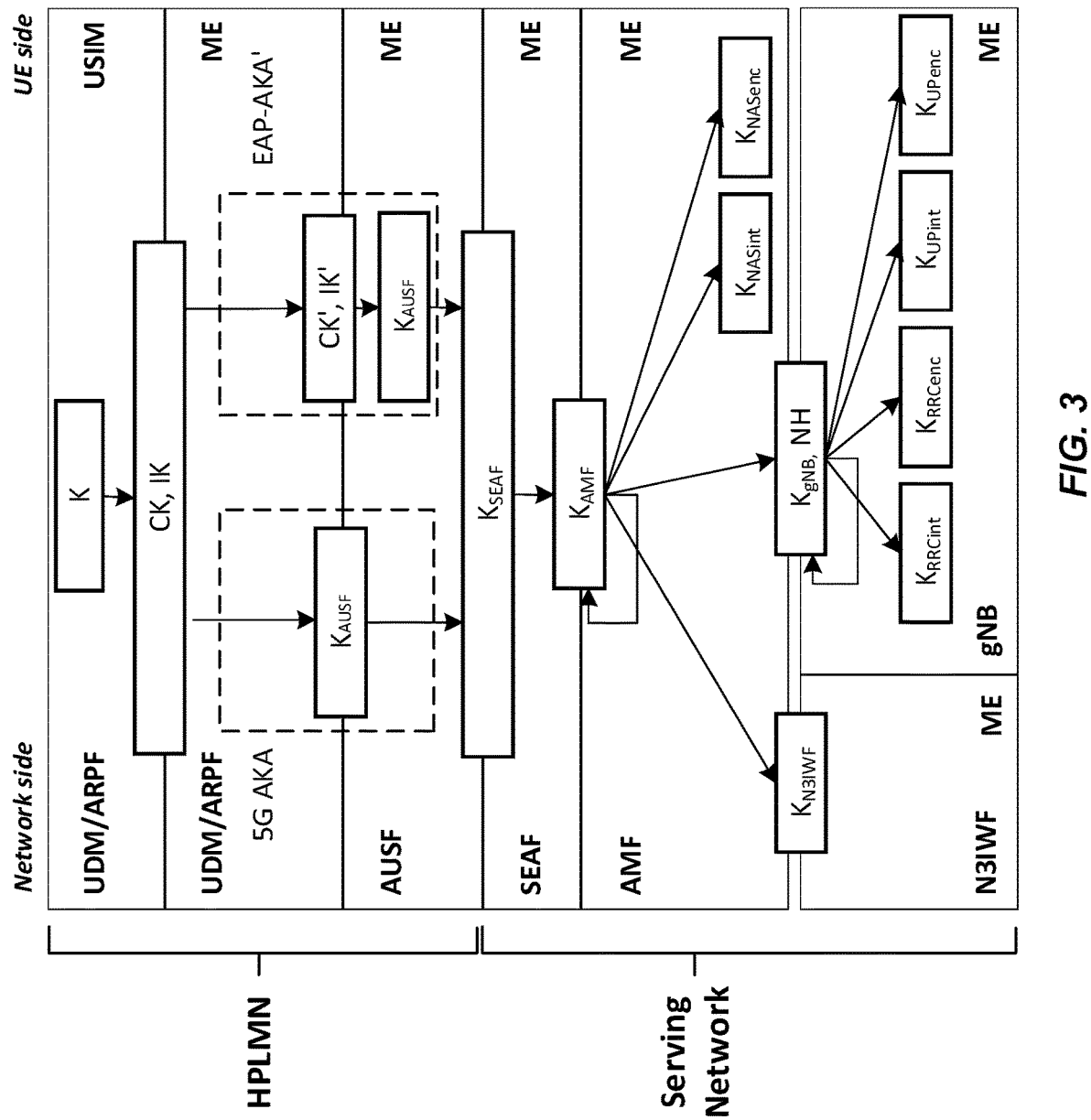
FIG. 3 shows an exemplary hierarchy of security keys in a 5G network.

In general, security mechanisms for various 5GS protocols rely on multiple security keys. 3GPP TS 33.501 specifies these keys in the organized hierarchy shown in FIG. 3. At the top is the long-term key part of the authentication credential and stored in the SIM card on the UE side and in the UDM/ARPF in the user's HPLMN.

A successful Primary Authentication run between the UE and the AUSF in the HPLMN leads to the establishment of $K_{AUSF}$, the second level key in the hierarchy. This key is not intended to leave the HPLMN and is used to secure the exchange of information between UE and HPLMN, such as for the provisioning of parameters to the UE from UDM in HPLMN. More precisely, $K_{AUSF}$ is used for integrity protection of messages delivered from HPLMN to UE. As described in 3GPP TS 33.501, such new features include the Steering of Roaming (SoR) and the UDM parameter delivery procedures.

$K_{AUSF}$ is used to derive another key, KSEAF, that is sent to the serving PLMN. This key is then used by the serving PLMN to derive subsequent NAS and AS protection keys. These lower-level keys together with other security parameters (e.g., cryptographic algorithms, UE security capabilities, value of counters used for replay protection in various protocols, etc.) constitute the 5G security context as defined in 3GPP TS 33.501. However, $K_{AUSF}$ is not part of the UE's 5G security context that resides in the UE's serving PLMN.

As mentioned above, 3GPP Rel-16 also introduces support for NPNs. This feature is intended to help verticals make use of the 5G services. NPNs can be deployed as Stand-alone NPNs (SNPN) when they do not rely on network functions provided by a PLMN. Alternately, NPNs can be deployed as Public Network Integrated NPNs (PNI-NPNs) when they rely functions provided by a PLMN.

Rel-16 enhancements specified for SNPNs include updates to the primary authentication procedures used by UEs to add support for any key-generating extensible authentication protocol (EAP) method. As such, $K_{AUSF}$ can be derived from authentication credentials that are specific to the EAP method. More specifically, $K_{AUSF}$ can be derived from an extended master session key (EMSK) resulting from EAP procedures.

3GPP is currently working on further enhancements to NPN supporting Rel-17. The architectural study for this work is captured in 3GPP TR 23.700-07 and the corresponding security study is captured in 3GPP TR 33.857. This work is based on the following terminology:

Default UE credentials: Information that the UE has before the actual onboarding procedure that makes the UE uniquely identifiable and verifiably secure.

Default Credential Server (DCS): The server that can authenticate a UE with default UE credentials or provide means to another entity to do it. DCS is the "external entity to the SNPN" mentioned above.

NPN credentials: Information that the UE uses for authentication to access an NPN. NPN credentials may be 3GPP credentials or non-3GPP credentials.

Onboarding Network (ON): The network providing initial registration and/or access to the UE for UE Onboarding.

Provisioning Server (PS): The server that provisions the authenticated/authorized UE with the subscription data and optionally other configuration information.

Subscription Owner (SO): The entity that stores and as result of the UE Onboarding procedures provide the subscription data and optionally other configuration information via the PS to the UE.

UE Onboarding: Provisioning of information, to a UE and within the network, required for the UE to get authorized access and connectivity to an NPN.

Unique UE identifier: Identifying the UE in the network and the DCS and is assigned and configured by the DCS.

One of the objectives of the Rel-17 work is "UE Onboarding and remote provisioning". In general, this topic relates to the provisioning of information, to a UE and within the network, required for the UE to get authorized access and connectivity to an NPN. The architectural work captured in 3GPP TR 23.700-07 relates to UE identification, exposure application programming interface (API), network selection, authentication, and authorization procedure for UE and SNPN. Additional details include architecture enhancements to enable provisioning of SNPN credentials for primary authentication and SNPN configurations into the UE that enable SNPN access. The security aspects captured in 3GPP TR 33.857 are primarily related to two issues: securing initial access for UE onboarding between UE and SNPN, and provisioning of credentials.

Figure 4:
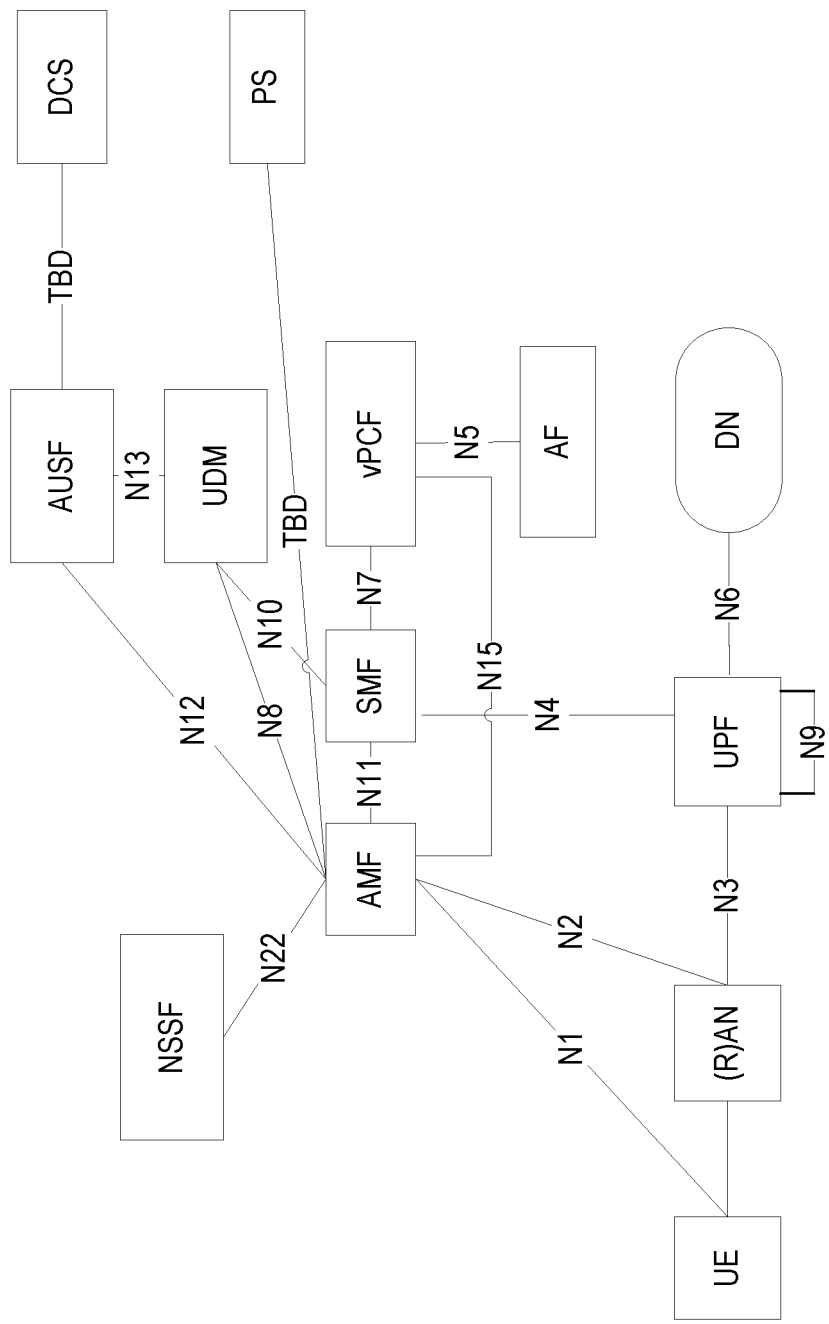
FIG. 4 shows an exemplary onboarding architecture.

A candidate UE onboarding architecture is described in 3GPP TR 23.700-07 section 6.6. This control-plane (CP) onboarding architecture is also shown in FIG. 4, which includes many of the NFs and interfaces shown in FIG. 2. In addition, FIG. 4 includes a PS and a DCS, as those terms are defined above, along with the following additional interfaces:

N8 between AMF and UDM;
N10 between SMF and UDM;
N12 between AMF and AUSF;
N13 between AUSF and UDM;
N22 between AMF and NSSF;
An interface between AMF and PS, with name to be determined (TBD); and
An interface between AUSF and DCS, with name TBD.

One of the solutions being considered in 3GPP TR 33.857 is referred to as "solution #11", which is described by the following excerpt from that TR:

\*\*\* Begin excerpt from 3GPP TR 33.857 \*\*\*

6.11 Solution #11: Securing initial access by using primary authentication.

6.11.1 Introduction

This solution addresses key issue #4 (Securing initial access for UE onboarding between UE and SNPN).

This solution describes a high-level framework for securing the initial access over the onboarding network (ON) by using primary authentication. Once the initial access is established, the UE uses this access to communicate with the provisioning server to receive the necessary SNPN credentials. The actual provisioning mechanisms are outside the scope of this solution.

6.11.2 Solution Details

In this solution, it is assumed that the UE is provisioned with the necessary credentials (including Unique UE Identifier, Default UE credentials) by the Default Credential Server (DCS) so that the primary authentication can be performed between the UE and onboarding network/DCS. The DCS also maintains these credentials so that primary authentication can be performed between the UE and the DCS. The actual method/processes used to configure this information in the UE and the DCS is outside the scope of this solution.

In this solution, the following trust/security relationships are assumed:

ON trusts the DCS to perform primary authentication of the UE for the initial access.
DCS has a roaming relationship with the ON for the purposes of initial access and trusts the ON to perform the functions of 5G serving network.
UE and the PS have a trust relationship that is used to provide end-to-end confidentiality, integrity and reply protection of the SNPN credentials between the UE and the PS. Therefore, no specific trust is assumed between the PS and the ON/DCS for the secure provisioning of the SNPN credentials.

\*\*\* End excerpt from 3GPP TR 33.857 \*\*\*

Figure 5:
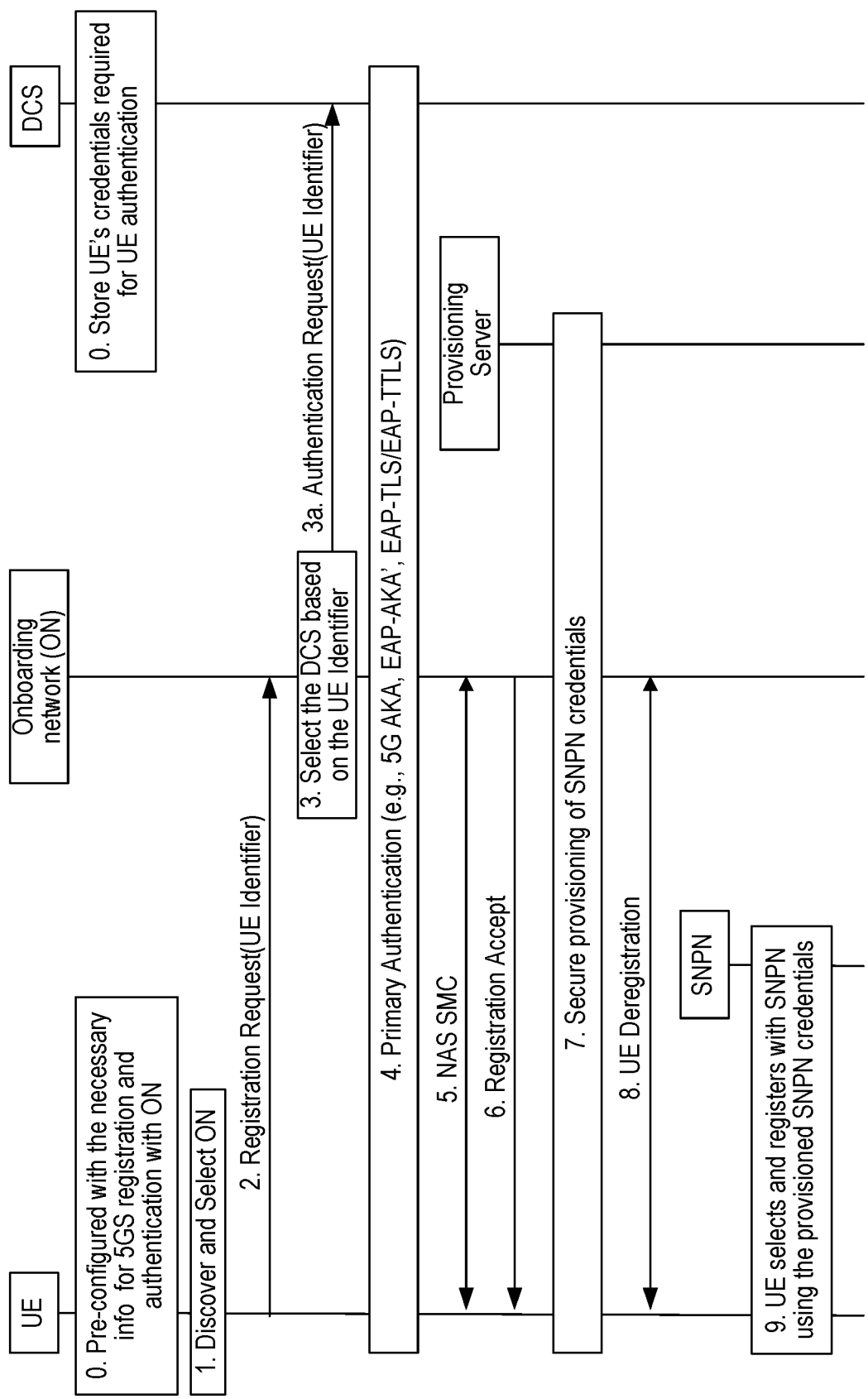
FIG. 5 shows a signal flow diagram of a security-related procedure between a UE, an onboarding network (ON), a default credentials server (DCS), a provisioning server (PS), and a standalone non-public network (SNPN).

Solution #11 can also be described by FIG. 5, which shows a signal flow diagram of a security-related procedure between a UE, an ON, a DCS, a PS, and an SNPN. Although the operations shown in FIG. 5 are given numerical labels, these are meant to facilitate explanation and do not imply any strict temporal order of the operations, unless specifically noted otherwise.

In operation 0, the UE is pre-configured by the DCS with the necessary information (e.g., Unique UE Identifier, Default UE credentials) for the UE to register with the ON. In case AKA based credentials are used, they shall be stored on the universal integrated circuit card (UICC, also known as SIM). In case of non-AKA credentials, the storage and handling of these non-AKA credentials within the UE are not in the scope of this solution. The UE is not configured with any SNPN credentials. The DCS also stores the UE's credentials information required for the authentication of the UE.

In operation 1, the UE discovers and performs ON selection. In operation 2, the UE sends a Registration Request to the ON. The request includes the UE identifier. In case of AKA-based credentials, UE identifier is set to the subscription concealed identifier (SUCI) as specified in 3GPP TS 33.501. In case of non-AKA based credentials, the UE identifier shall be in NAI format, in which case UE identifier privacy, if required, is provided by the selected EAP authentication method.

In operation 3, based on the received UE identifier, the ON selects the DCS and forwards the authentication request to the DCS. In operation 4, the ON interacts with the DCS to perform primary authentication of the UE. Based on the UE identifier received from the ON, the DCS selects the authentication method. The authentication method can be either AKA-based (5G AKA or EAP-AKA') or non-AKA-based (e.g., EAP-TLS or EAP-TTLS). In case of non-AKA based methods, the selected EAP method shall be a key-generating EAP method that provides mutual authentication.

Once the primary authentication is successful, $K_{AUSF}$ is established as follows. If the DCS is 5GS aware (i.e., supports 5G key hierarchy), the UE and the DCS establish $K_{AUSF}$; otherwise, if DCS is a legacy AAA server, the DCS sends the MSK to the ON, which is used to derive the $K_{AUSF}$ between the UE and the ON. The rest of the keys in the 5GS key hierarchy are derived as specified in 3GPP TS 33.501. At the end of this step, in case UE subscriber privacy is in force, the DCS also provides the UE's subscription permanent identifier (SUPI) to the ON.

In operation 5, a NAS SMC (security mode command) procedure is performed between the UE and the ON, establishing NAS security based on one or more keys. Subsequently, in operation 6, the ON sends a Registration Accept to the UE. The UE is now ready to securely access the Provisioning Server. In operation 7, the PS securely provisions the SNPN credentials. The provisioning of SNPN credentials may be CP-based or User Plane (UP)-based. In either case, provisioning messages are protected end-to-end between the UE and the PS. In case of CP-based provisioning, provisioning messages are routed either via the DCS (when DCS is 5GS aware, e.g., by hosting UDM/AUSF) or directly via the ON (when the DCS is non-5GS aware). In addition, whether the provisioning messages are transferred via ON or DCS may depend on a service level agreement (SLA) among different parties involved (e.g., DCS, ON, PS).

After provisioning of SNPN credentials is completed, the UE de-registers from the ON in operation 8. In operation 9, the UE uses the provisioned credentials to register with the SNPN.

Currently, the credential provisioning technique and/or protocol used in operation 7 above is not specified and/or described in 3GPP TRs 23.700-07 and 33.857. Moreover, the solutions studied in these TRs propose to keep the credential provisioning technique and/or protocol out of the scope of later 3GPP technical specifications (TS). One rationale is that there are several preferred credential provisioning techniques and/or protocols, and 3GPP should not restrict vendor flexibility by specifying only one. While this approach may provide flexibility, it also introduces interoperability problems if devices and networks support different credential provisioning techniques and/or protocols.

Embodiments of the present disclosure address these and other problems, issues, and/or difficulties by providing an integrity-protected indication (e.g., during so-called "initial access") to the UE regarding which credential provisioning protocol will be used to provision the SNPN credentials to the UE. The phrase "credential provisioning protocol" is used herein to refer to any technique, method, procedure, protocol, etc. used for secure provisioning of credentials for accessing an SNPN. Examples of credential provisioning protocols include CMPv2, ACME, EST, SCEP, GSMA eSIM specifications, and OMA LwM2M.

In other words, when a UE accesses an ON and it does not have the needed credentials to access its target SNPN network, the UE needs to be provisioned with credentials for the target SNPN network. However, the UE and/or the PS may have implemented several different credential provisioning protocols. During initial access to the ON or when accessing the PS, the UE can receive an integrity-protected indication of which UE-supported credential provisioning protocol is to be used.

These embodiments can provide various benefits and/or advantages. For example, such techniques can facilitate interoperability among vendors that utilize various credential provisioning protocols that would otherwise be incompatible with each other. This can improve the ability of a UE to access wider range of SNPNs via ONs and DCS's that utilize a range of different credential provisional protocols.

For convenience of description, embodiments of the present disclosure are organized into three groups, each of which may include various embodiments and/or variants. Even so, it should be understood that certain principles, techniques, embodiments, variants, and/or features may be applicable to multiple groups.

In various embodiments, the DCS is typically an Authentication, Authorization and Accounting, AAA, server residing in a third party network. For some embodiments, it may also implement some 5G functionality such as UDM, ARPF, SIDF and AUSF. The ON typically consists of a RAN and CN. The ON and the DCS interact as shown below to exchange authentication and other information. Examples of which entities in the ON are involved in the procedures are described below.

Figure 6:
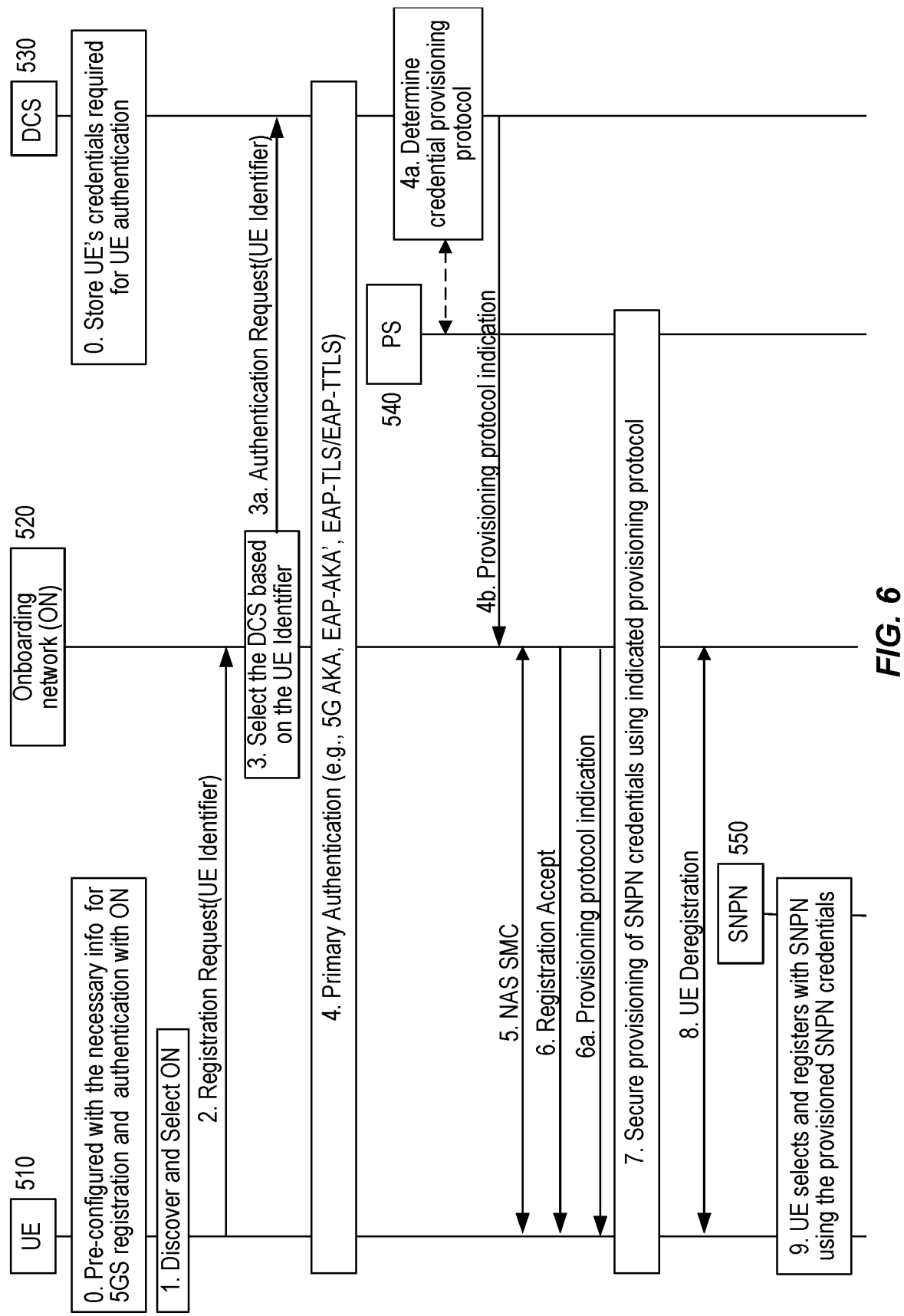
FIGS. 6-8 show various signal flow diagrams of exemplary procedures between a UE, an ON, a DCS, a PS, and an SNPN, according to various exemplary embodiments of the present disclosure.

FIG. 6 shows a signal flow diagram of a procedure between a UE (510), an ON (520), a DCS (530), a PS (540), and an SNPN (550), according to various embodiments of the first group. For convenience, the following description will refer to these entities without their corresponding reference numbers. Although the operations shown in FIG. 6 are given numerical labels, these are meant to facilitate explanation and do not imply any strict temporal order of the operations, unless specifically noted otherwise.

Operations 0-4 are identical to operations 0-4 respectively in FIG. 5, described above. In operation 4, the DCS may receive the UE identifier directly from the ON (e.g., AMF) or via a proxy function between the ON (e.g., AMF) and DCS.

In operation 4a, upon successful (or alternatively during) primary authentication in operation 4, the DCS determines or selects the credential provisioning protocol to be used for the UE. In operation 4b, the DCS integrity protects a credential provisioning protocol indication with key material known to the UE and DCS (e.g., key material resulting from the authentication or using public key signature) and sends the indication to the ON. For example, the DCS can send the integrity-protected indication to an AMF, SEAF, SMF, or PCF in the ON.

In some embodiments, the credential provisioning protocol selected in operation 4a is pre-configured in DCS. In other embodiments, the DCS can determine the credential provisioning protocol based on input from the PS. For example, the DCS can obtain, fetch, or receive the credential provisional protocol indication from the PS. In a variant, an indication obtained from the PS can be integrity-protected with key material known to the UE and PS.

In some embodiments, the UE may indicate its supported credential provisioning protocols to the DCS via the ON. This can be done in the Registration Request of operation 2, and the ON can send those to the DCS in an operation 3a (not shown, e.g., an authentication request or other AAA protocol message). The DCS may then select one of the UE-supported credential provisioning protocols based on its local policy, or it can send an indication of the UE-supported credential provisioning protocols to the PS for selection.

In some embodiments, the DCS sends the credential provisioning protocol indication to the ON in operation 4b, but the DCS does not integrity-protect it with key material known to the DCS and UE. Instead, the indication is integrity protected by the ON (e.g., AMF) when the ON sends the indication to the UE.

In some embodiments, the DCS sends the credential provisioning protocol indication to the ON in an Nausf_U-EAuthentication_Authenticate Response message or in another AAA message between the DCS and ON.

In some embodiments, the credential provisioning protocol indication additionally or alternatively indicates whether the credential provisioning will happen over CP or over UP.

Operations 5-6 are identical to operations 5-6 respectively in FIG. 5, described above. After sending the Registration Accept in operation 6 (signifying that registration is complete), the ON (e.g., AMF, SMF, or PCF) sends the credential provisioning protocol indication received in operation 4b to the UE in a NAS message.

In some embodiments, the credential provisioning protocol indication is sent using the steering of roaming (SOR) or UE parameter update (UPU) delivery mechanism from the DCS to the UE. In the former case the indication may be sent (i.e., in operation 4b) from the DCS to the ON in Nudm_SDM_Get response message and in the latter case in Nudm_SDM_notification message. The AMF in ON sends the indication to the UE in a NAS message (in operation 6a).

In some embodiments, the ON sends the credential provisioning protocol indication to the UE during registration, e.g., in operation 5 (NAS SMC) or operation 6 (Registration Accept). In such embodiments, operation 6a shown in FIG. 6 is effectively part of one of these operations.

In operation 7, the PS securely provisions the UE's SNPN credentials using the credential provisioning protocol indicated by the ON to the UE. Operations 8-9 are identical to operations 8-9 respectively in FIG. 5, described above.

Figure 7:
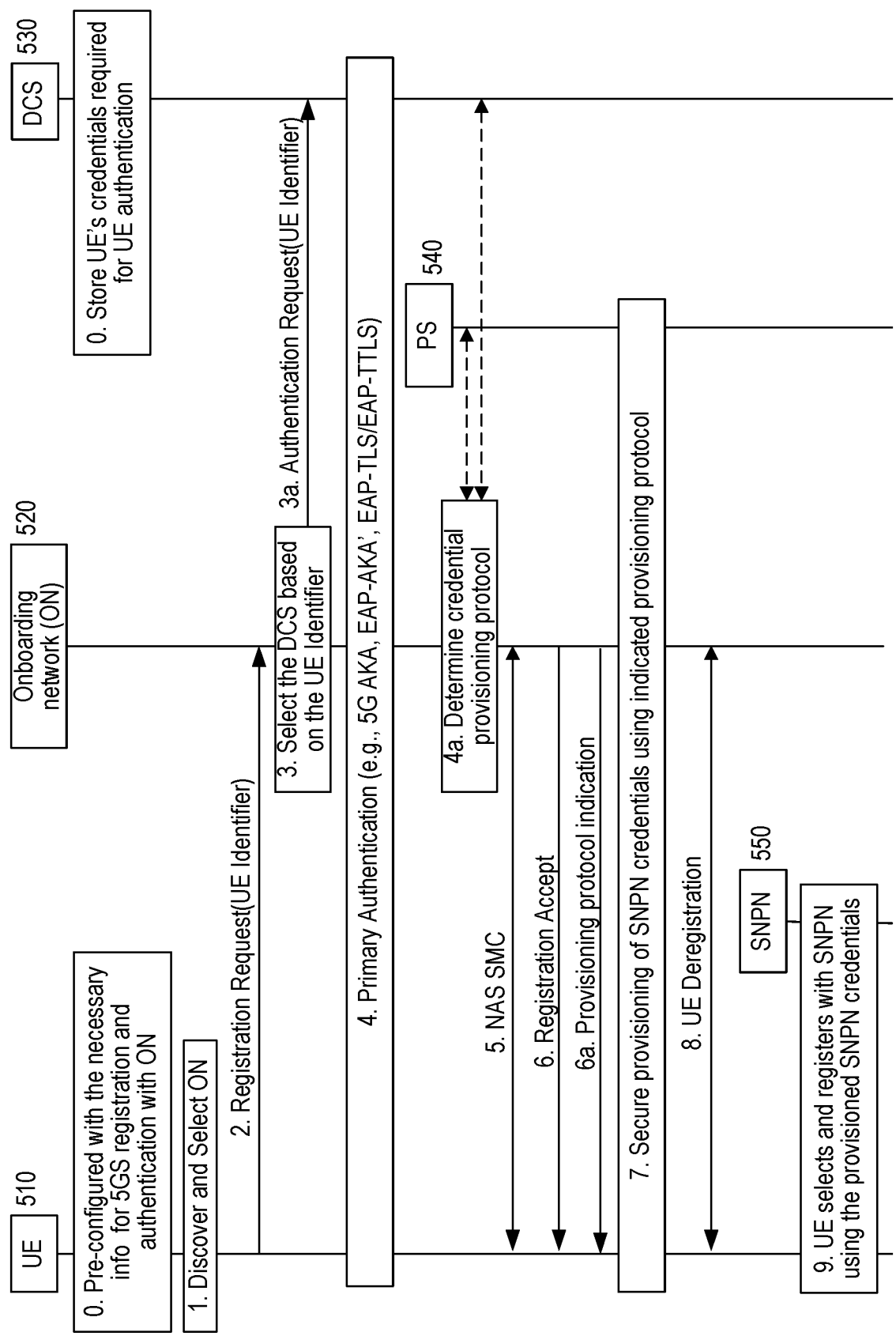

FIG. 7 shows a signal flow diagram of a procedure between a UE (510), an ON (520), a DCS (530), a PS (540), and an SNPN (550), according to various embodiments of the second group. For convenience, the following description will refer to these entities without their corresponding reference numbers. Although the operations shown in FIG. 7 are given numerical labels, these are meant to facilitate explanation and do not imply any strict temporal order of the operations, unless specifically noted otherwise.

Operations 0-4 are identical to operations 0-4 respectively in FIG. 5, described above. In operation 4, the DCS may receive the UE identifier directly from the ON (e.g., AMF) or via a proxy function between the ON (e.g., AMF) and DCS.

In operation 4a, upon successful (or alternatively during) primary authentication in operation 4, the ON (e.g., AMF) determines or selects the credential provisioning protocol to be used for the UE. Operations 5-6 are identical to operations 5-6 respectively in FIG. 5, described above. After sending the Registration Accept in operation 6 (signifying that registration is complete), the ON (e.g., AMF, SMF, or PCF) sends the credential provisioning protocol indication received in operation 4b to the UE in a NAS message.

In some embodiments, the ON sends the credential provisioning protocol indication to the UE during registration, e.g., in operation 5 (NAS SMC) or operation 6 (Registration Accept). In such embodiments, operation 6a shown in FIG. 6 is effectively part of one of these operations.

In some embodiments, the credential provisioning protocol indication additionally or alternatively indicates whether the credential provisioning will happen over CP or over UP.

In some embodiments, the credential provisioning protocol selected in operation 4a is predetermined (e.g., preconfigured) in the ON (e.g., AMF). In other embodiments, the ON can determine the credential provisioning protocol based on input from the PS. For example, the ON can obtain, fetch, or receive the credential provisional protocol indication from the PS. In a variant, an indication obtained from the PS can be integrity-protected with key material known to the UE and PS.

In some embodiments, the UE may indicate its supported credential provisioning protocols to the ON (e.g., AMF), e.g., in the Registration Request of operation 2. The ON may then select one of the UE-supported credential provisioning protocols based on its local policy, or it can send an indication of the UE-supported credential provisioning protocols to the PS or DCS for selection.

In operation 7, the PS securely provisions the UE's SNPN credentials using the credential provisioning protocol indicated by the ON to the UE. Operations 8-9 are identical to operations 8-9 respectively in FIG. 5, described above.

Figure 8:
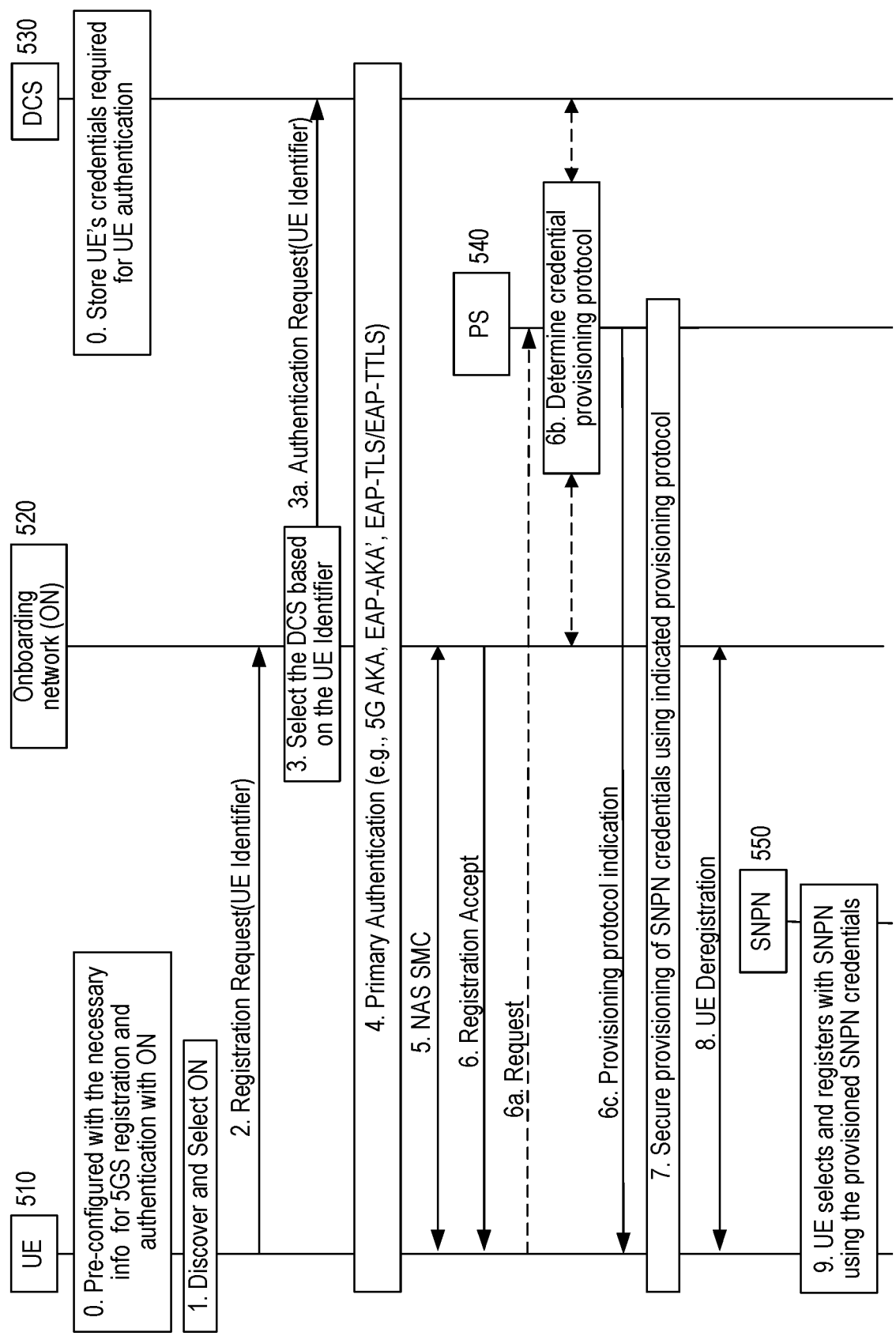

FIG. 8 shows a signal flow diagram of a procedure between a UE (510), an ON (520), a DCS (530), a PS (540), and an SNPN (550), according to various embodiments of the third group. For convenience, the following description will refer to these entities without their corresponding reference numbers. Although the operations shown in FIG. 8 are given numerical labels, these are meant to facilitate explanation and do not imply any strict temporal order of the operations, unless specifically noted otherwise.

Operations 0-6 are identical to operations 0-6 respectively in FIG. 5, described above. In operation 4, the DCS may receive the UE identifier directly from the ON (e.g., AMF) or via a proxy function between the ON (e.g., AMF) and DCS. In operation 6a, which is optional, the UE sends a request to the PS to start the provisioning process. This message may be an HTTP-type request or a message of a particular provisioning protocol. In operation 6b, the PS determines the credential provisioning protocol to be used for the UE.

In some embodiments, the credential provisioning protocol selected in operation 6b is pre-configured in the PS. In other embodiments, the PS can determine the credential provisioning protocol based on input from the ON and/or the DCS. For example, the PS can obtain, fetch, or receive the credential provisional protocol indication from the ON or DCS. As another example, the UE may indicate its supported credential provisioning protocols to the PS in the request of operation 6a. The PS may then select one of the UE-supported credential provisioning protocols based on its local policy, or it can send an indication of the UE-supported credential provisioning protocols to the ON or DCS for selection.

In operation 6c, the PS integrity-protects a credential provisioning protocol indication with key material known to the UE and PS (e.g., key material resulting from the authentication or using public key signature) and sends the indication to the UE. This message may be an HTTP-type message or a message of a particular provisioning protocol.

In operation 7, the PS securely provisions the UE's SNPN credentials using the credential provisioning protocol indicated to the UE. Operations 8-9 are identical to operations 8-9 respectively in FIG. 5, described above.

The embodiments described above can be further illustrated with reference to FIGS. 8-11, which depict exemplary methods (e.g., procedures) performed by a UE, an onboarding network (ON), a default credential server (DCS), and a provisioning server (PS), respectively. Put differently, various features of the operations described below correspond to various embodiments described above. The exemplary methods shown in FIGS. 8-11 can be used cooperatively (e.g., with each other and/or with other exemplary methods described herein) to provide benefits, advantages, and/or solutions to problems. Although the exemplary methods are shown in FIGS. 8-11 by specific blocks in particular orders, the operations corresponding to the blocks can be performed in different orders than shown and can be combined and/or divided into operations having different functionality than shown. Optional blocks and/or operations are indicated by dashed lines.

Figure 9:
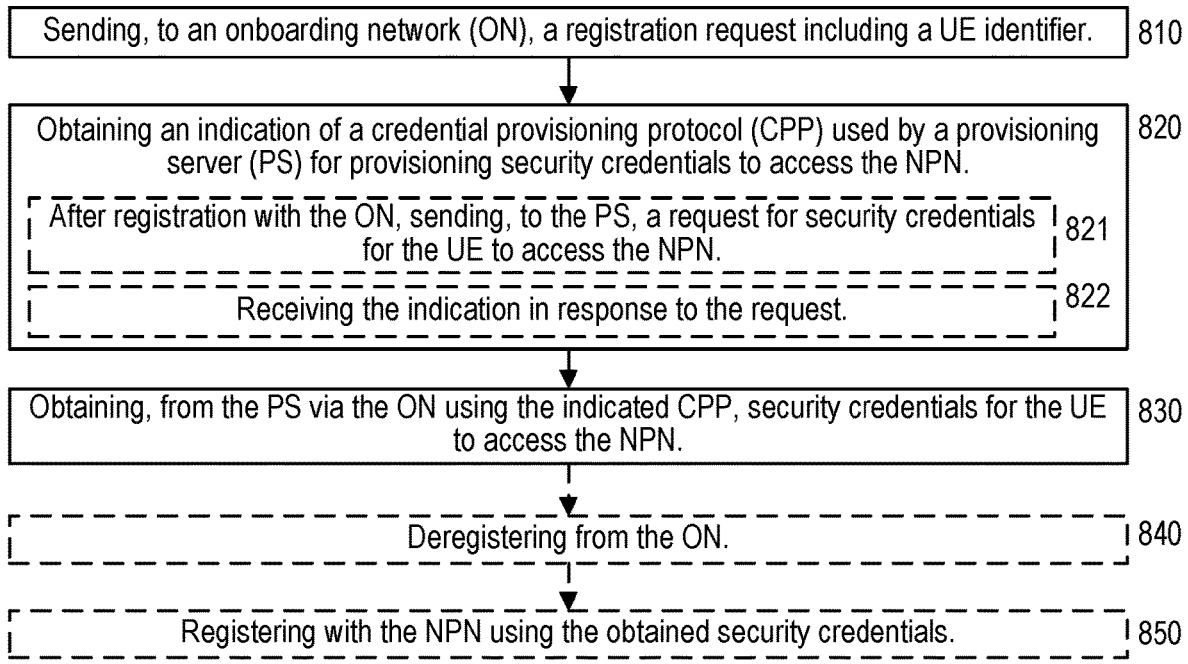
FIG. 9 illustrates an exemplary method (e.g., procedure) for a UE, according to various exemplary embodiments of the present disclosure.

More specifically, FIG. 9 illustrates an exemplary method (e.g., procedure) to obtain security credentials for accessing a non-public network (NPN), according to various exemplary embodiments of the present disclosure. The exemplary method shown in FIG. 9 can be performed by a UE (e.g., wireless device) such as described herein with reference to other figures. For example, the NPN can be a standalone NPN (SNPN).

The exemplary method can include the operations of block 810, where the UE can send, to an onboarding network (ON), a registration request that includes an identifier of the UE. The exemplary method can also include the operations of block 820, where the UE can obtain an indication of a credential provisioning protocol (CPP) used by a provisioning server (PS) for provisioning security credentials to access the NPN. The exemplary method can also include the operations of block 830, where the UE can obtain, from the PS via the ON using the indicated CPP, security credentials for the UE to access the NPN.

In some embodiments, the exemplary method can also include the operations of blocks 840-850, wherein the UE can deregister from the ON and register with the NPN using the obtained security credentials.

In some embodiments, the registration request (e.g., in block 810) can include an indication of one or more UE-supported CPPs. In such case, the indicated CPP (e.g., in block 820) is one of the UE-supported CPPs. In some embodiments, the indicated CPP can be one of the following: CMPv2, ACME, EST, SCEP, GSMA eSIM, or OMA LwM2M.

In some embodiments, the indication (e.g., in block 820) can be integrity-protected based on key material known to the UE and the PS. In some embodiments, the indication can include an indication of whether the CPP is performed via control plane or user plane communications with the UE.

In some embodiments, the indication can be obtained from the ON. For example, the indication can be obtained from the ON in a message of a non-access stratum security mode command (NAS SMC) procedure (e.g., operation 5 in FIGS. 6-8) or in a registration accept (e.g., operation 6 in FIGS. 6-8) that is responsive to the registration request.

Figure 10:
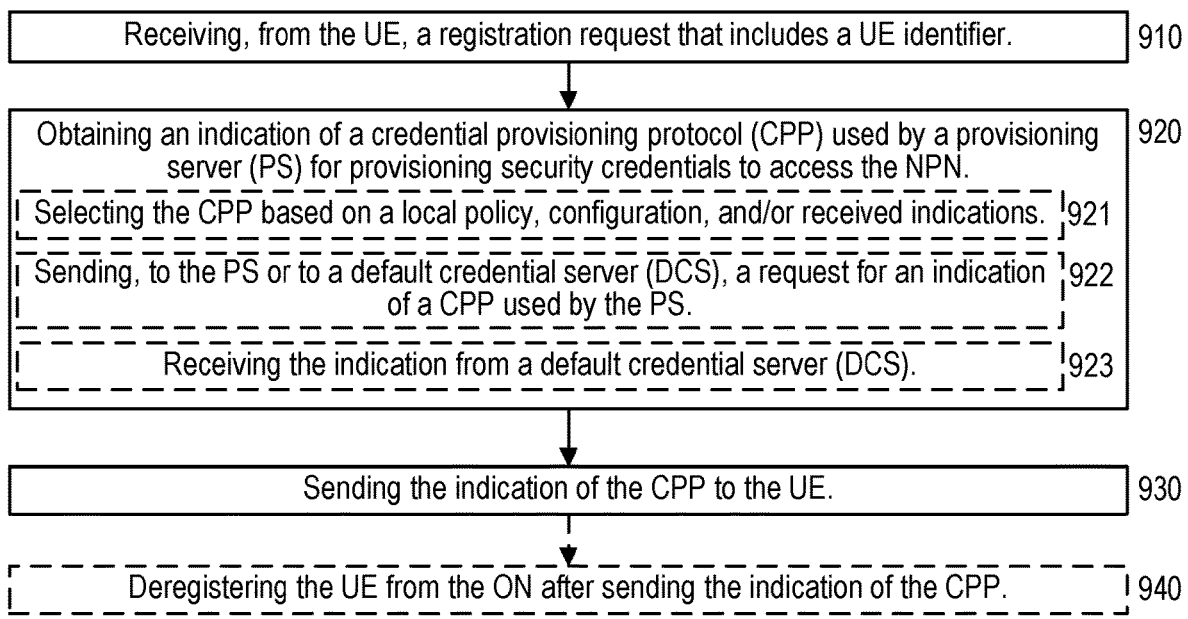
FIG. 10 illustrates an exemplary method (e.g., procedure) for an ON, according to various exemplary embodiments of the present disclosure.

In addition, FIG. 10 illustrates another exemplary method (e.g., procedure) for facilitating UE access to a non-public network (NPN), according to various exemplary embodiments of the present disclosure. The exemplary method shown in FIG. 10 can be performed by an onboarding network (ON), such as by one or more network nodes or functions (e.g., AMF) described herein with reference to other figures. For example, the NPN can be an SNPN.

The exemplary method can include the operations of block 910, where the ON can receive, from the UE, a registration request that includes an identifier of the UE. The exemplary method can also include the operations of block 920, where the ON can obtain an indication of a credential provisioning protocol (CPP) used by a provisioning server (PS) for provisioning security credentials to access the NPN. The exemplary method can also include the operations of block 930, where the ON can send the indication of the CPP to the UE.

In some embodiments, the exemplary method can also include the operation of block 940, where the ON can deregister the UE after sending the indication of the CPP.

In some embodiments, the indication can be sent to the UE (e.g., in block 930) in a message of a non-access stratum security mode command (NAS SMC) procedure (e.g., operation 5 in FIGS. 6-8) or in a registration accept (e.g., operation 6 in FIGS. 6-8) that is responsive to the registration request. In some embodiments, the indication sent to the UE can be integrity-protected based on key material known to the UE and the PS.

In some embodiments, the indication obtained (e.g., in block 920) and sent to the UE (e.g., in block 930) can include an indication of whether the CPP is performed via control plane or user plane communications with the UE. In some embodiments, the indicated CPP can be one of the following: CMPv2, ACME, EST, SCEP, GSMA eSIM, or OMA LwM2M.

In some embodiments, obtaining the indication in block 920 can include the operations of sub-block 921, where the ON can select the CPP based on one or more of the following:
- a predetermined CPP, configured in the ON;
- a CPP selection policy, configured in the ON;
- an indication of one or more UE-supported CPPs, included in the registration request; and
- an indication of one or more PS-supported CPPs, received from the PS or from a default credential server (DCS).

In other embodiments, obtaining the indication in block 920 can include the operations of sub-block 923, where the ON can receive the indication from a DCS or from the PS. In some of these embodiments, the received indication can be integrity-protected based on key material known to the UE and the PS.

In some of these embodiments, obtaining the indication in block 920 can include the operations of sub-block 922 where the ON can send, to the PS or to the DCS, a request for an indication of a CPP used by the PS. In such embodiments, the indication can be received from the PS or from the DCS in response to the request. In some variants, the registration request can include an indication of one or more UE-supported CPPs, the request to the PS or to the DCS also includes the indication of the one or more UE-supported CPPs, and the CPP indicated in the response to the request is one of the UE-supported CPPs.

Figure 11:
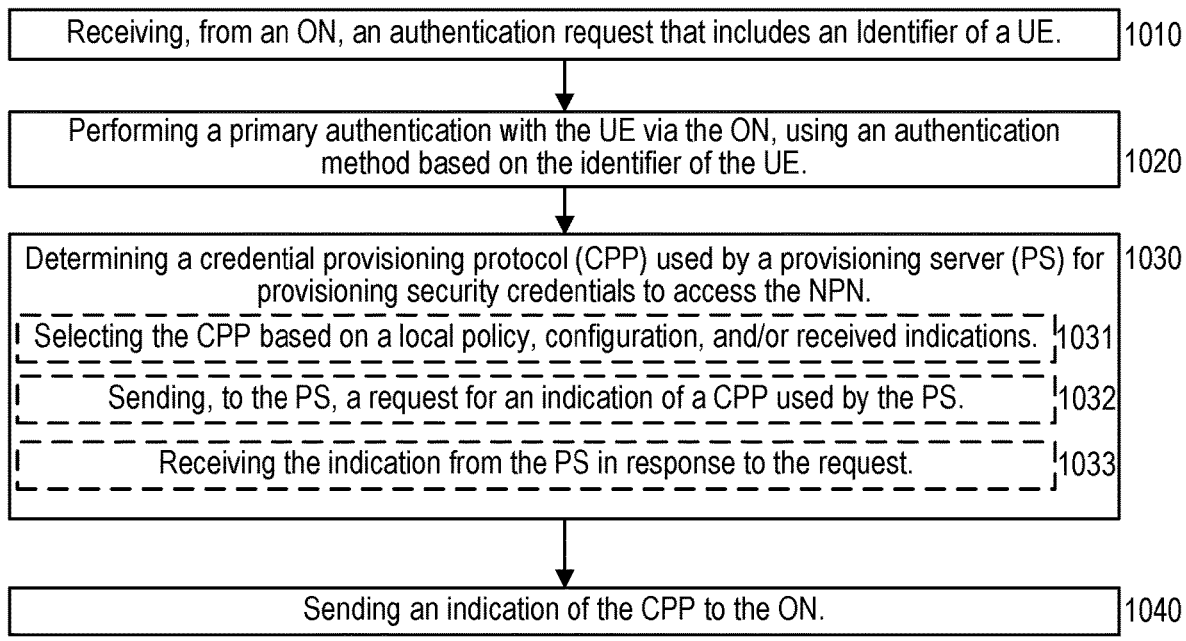
FIG. 11 illustrates an exemplary method (e.g., procedure) for a DCS, according to various exemplary embodiments of the present disclosure.

In addition, FIG. 11 illustrates another exemplary method (e.g., procedure) to facilitate user equipment (UE) access to a non-public network (NPN), according to various exemplary embodiments of the present disclosure. The exemplary method shown in FIG. 11 can be performed by a default credential server (DCS), such as described herein with reference to other figures. For example, the NPN can be an SNPN.

The exemplary method can include the operations of block 1010, where the DCS can receive, from an onboarding network (ON), an authentication request that includes an identifier of the UE. The exemplary method can also include the operations of block 1020, where the DCS can perform a primary authentication with the UE via the ON, using an authentication method based on the identifier of the UE. The exemplary method can also include the operations of block 1030, where the DCS can determine a credential provisioning protocol (CPP) used by a provisioning server (PS) for provisioning security credentials to access the NPN. The exemplary method can also include the operations of block 1040, where the DCS can send an indication of the CPP to the ON.

In some embodiments, the indication sent to the ON (e.g., in block 1040) can be integrity-protected based on key material known to the UE and the PS. In some embodiments, the indication sent to the ON includes an indication of whether the CPP is performed via control plane or user plane communications with the UE. In some embodiments, the determined and indicated CPP can be one of the following: CMPv2, ACME, EST, SCEP, GSMA eSIM, or OMA LwM2M.

In some embodiments, the determining operations of block 1030 can include the operations of sub-block 1031, where the DCS can select the CPP based on one or more of the following:
- a predetermined CPP, configured in the DCS;
- a CPP selection policy, configured in the DCS;
- an indication of one or more UE-supported CPPs, included in the authentication request; and
- an indication of one or more PS-supported CPPs, received from the PS.

In other embodiments, the determining operations of block 1030 can include the operations of sub-blocks 1032-1033, where the DCS can send, to the PS, a request for an indication of a CPP used by the PS; and receive the indication from the PS in response to the request. In some of these embodiments, the authentication request and the request to the PS can include an indication of one or more UE-supported CPPs, and the CPP indicated in the response to the request can be one of the UE-supported CPPs.

Figure 12:
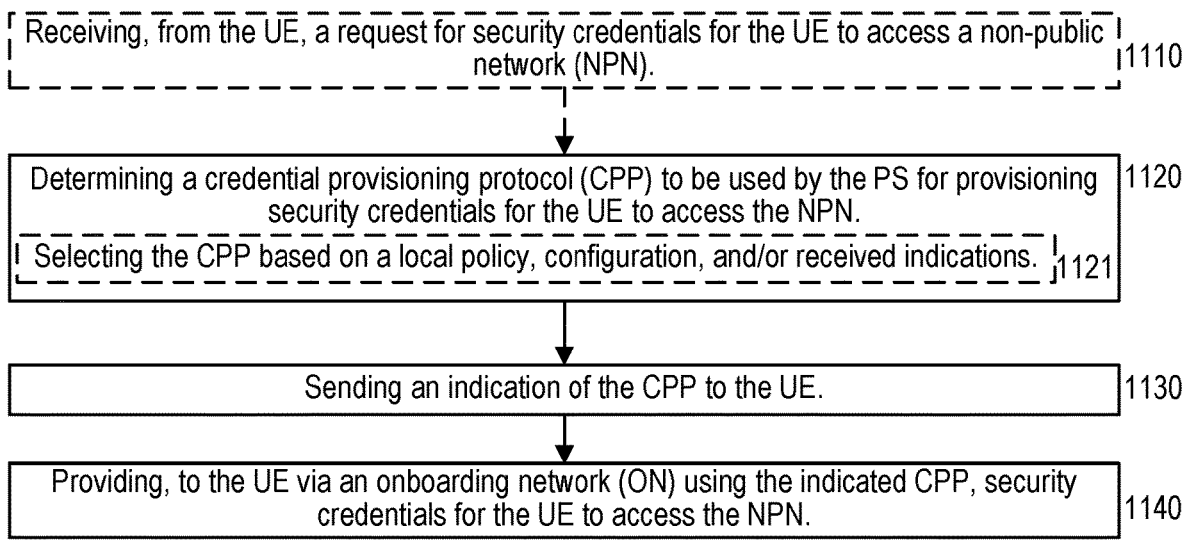
FIG. 12 illustrates an exemplary method (e.g., procedure) for a PS, according to various exemplary embodiments of the present disclosure.

In addition, FIG. 12 illustrates another exemplary method (e.g., procedure) to facilitate user equipment (UE) access to a non-public network (NPN), according to various exemplary embodiments of the present disclosure. The exemplary method shown in FIG. 12 can be performed by a provisioning server (PS) for the NPN, such as described herein with reference to other figures. For example, the NPN can be an SNPN.

The exemplary method can include the operations of block 1120, where the PS can determine a credential provisioning protocol (CPP) to be used by the PS for provisioning security credentials for the UE to access the NPN. The exemplary method can also include the operations of block 1130, where the PS can send an indication of the CPP to the UE. The exemplary method can also include the operations of block 1140, where the PS can provide, to the UE via an onboarding network (ON) using the indicated CPP, security credentials for the UE to access the NPN.

In some embodiments, the exemplary method can also include the operations of block 1110, where the PS can receive, from the UE, a request for security credentials for the UE to access the NPN. In such embodiments, the indication can be sent (e.g., in block 1140) in response to the request.

In some embodiments, the indication sent to the UE (e.g., in block 1140) can be integrity-protected based on key material known to the UE and the PS. In some embodiments, the indication sent to the UE can include an indication of whether the CPP is performed via control plane or user plane communications with the UE. In some embodiments, the determined and indicated CPP can be one of the following: CMPv2, ACME, EST, SCEP, GSMA eSIM, or OMA LwM2M.

In some embodiments, the determining operations of block 1120 can include the operations of sub-block 1121, where the PS can select the CPP based on one or more of the following:
 a predetermined CPP, configured in the PS;
 a CPP selection policy, configured in the PS;
 an indication of one or more UE-supported CPPs, included in a request received from the UE;
 one or more ON-supported CPPs, as indicated by the ON; and
 one or more CPPs supported by a default credentials server (DCS), as indicated by the DCS.

Figure 13:
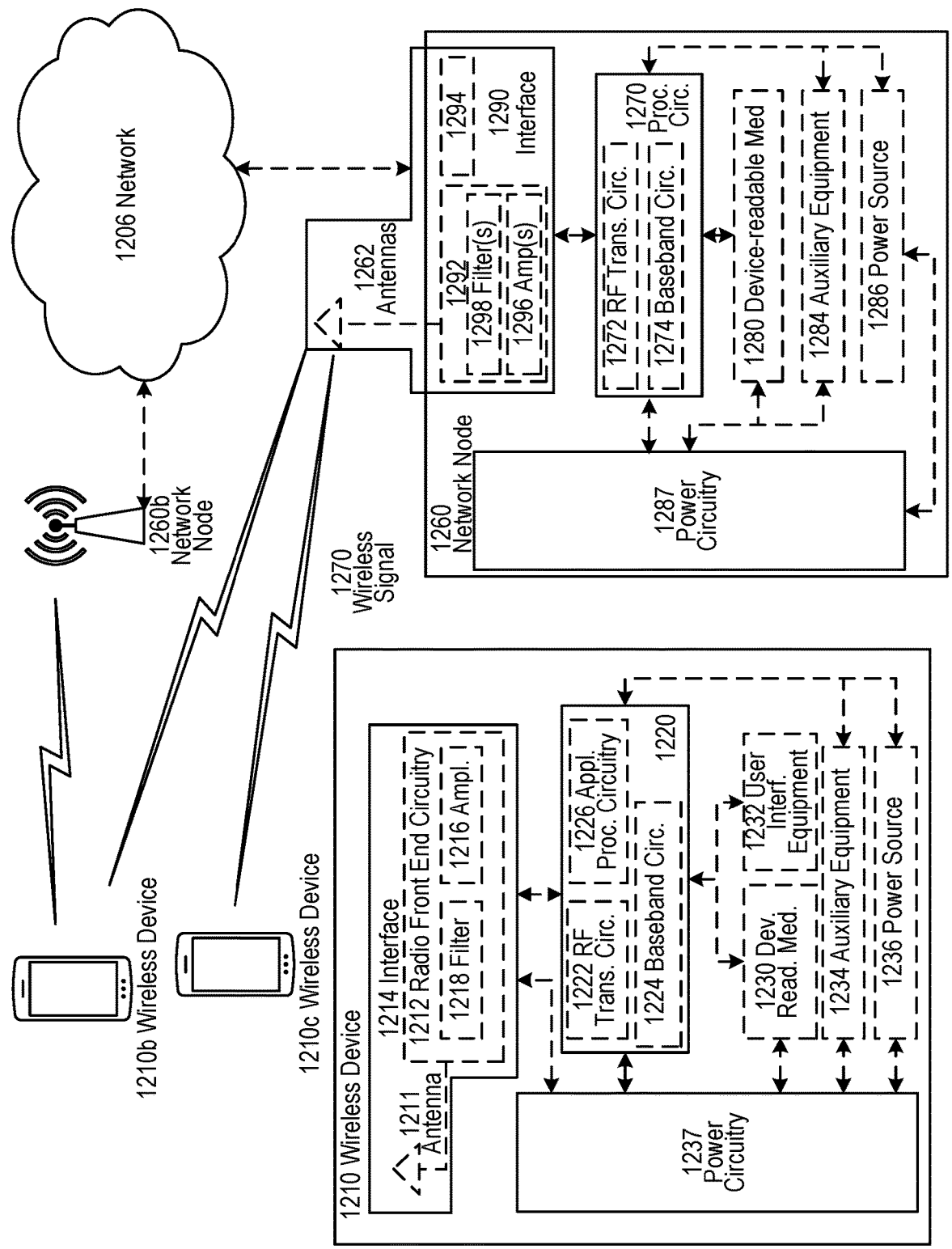
FIG. 13 illustrates a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1206, network nodes 1260 and 1260*b*, and WDs 1210, 1210*b*, and 1210*c*. In practice, a wireless network can further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and an RNC component, or a BTS component and a BSC component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1260, either alone or in conjunction with other network node 1260 components (e.g., device readable medium 1280). Such functionality can include any of the various wireless features, functions, or benefits discussed herein.

For example, processing circuitry 1270 can execute instructions stored in device readable medium 1280 or in memory within processing circuitry 1270. In some embodiments, processing circuitry 1270 can include a system on a chip (SOC). As a more specific example, instructions (also referred to as a computer program product) stored in medium 1280 can include instructions that, when executed by processing circuitry 1270, can configure network node 1260 to perform operations corresponding to various exemplary methods (e.g., procedures) described herein.

In some embodiments, processing circuitry 1270 can include one or more of radio frequency (RF) transceiver circuitry 1272 and baseband processing circuitry 1274. In some embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, eNB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some embodiments, processing circuitry 1270 and device readable medium 1280 can be considered to be integrated.

Interface 1290 is used in the wired or wireless communication of signaling and/or data between network node 1260, network 1206, and/or WD 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286. Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 13 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

Furthermore, various network functions (NFs, e.g., DCS, PS, ON functions, AMFs, SMFs, etc.) described herein can be implemented with and/or hosted by different variants of network node 1260, including those variants described above.

In some embodiments, a wireless device (WD, e.g., WD 1210) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220 and can be configured to condition signals communicated between antenna 1211 and processing circuitry 1220. Radio front end circuitry 1212 can be coupled to or a part of antenna 1211. In some embodiments, WD 1210 may not include separate radio front end circuitry 1212; rather, processing circuitry 1220 can comprise radio front end circuitry and can be connected to antenna 1211. Similarly, in some embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1210 functionality either alone or in combination with other WD 1210 components, such as device readable medium 1230. Such functionality can include any of the various wireless features or benefits discussed herein.

For example, processing circuitry 1220 can execute instructions stored in device readable medium 1230 or in memory within processing circuitry 1220 to provide the functionality disclosed herein. More specifically, instructions (also referred to as a computer program product) stored in medium 1230 can include instructions that, when executed by processor 1220, can configure wireless device 1210 to perform operations corresponding to various exemplary methods (e.g., procedures) described herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210 and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless network and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 14:
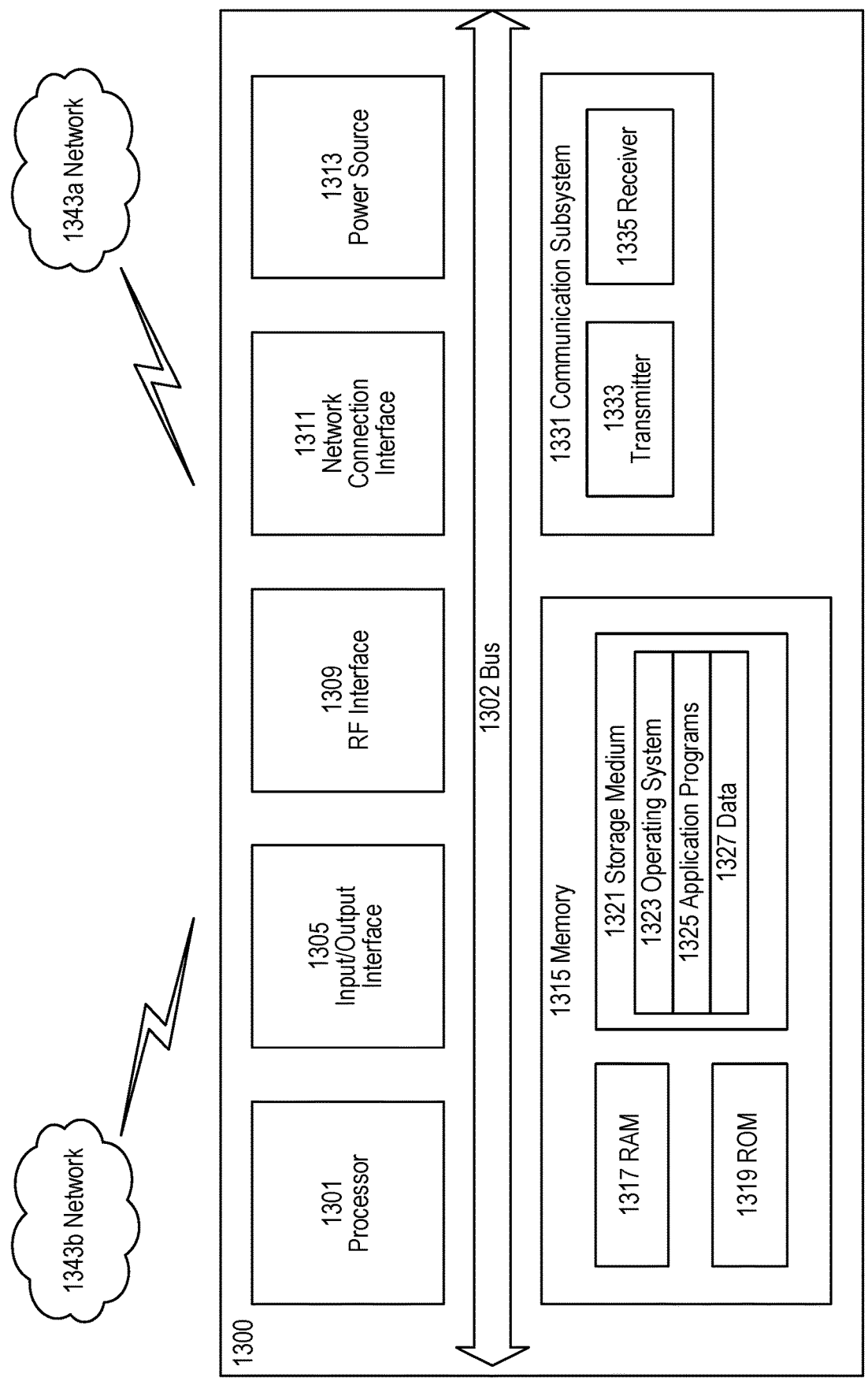
FIG. 14 shows an exemplary embodiment of a UE, in accordance with various aspects described herein.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1300 can be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1301 can be configured to process computer instructions and data. Processing circuitry 1301 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 can include two central processing units (CPUs). Data can be information in a form suitable for use by a computer.

In the depicted embodiment, input/output interface 1305 can be configured to provide a communication interface to an input device, output device, or input and output device. UE 1300 can be configured to use an output device via input/output interface 1305. An output device can use the same type of interface port as an input device. For example, a USB port can be used to provide input to and output from UE 1300. The output device can be a speaker, a sound card, a video card, a display, a monitor, a printer, an actuator, an emitter, a smartcard, another output device, or any combination thereof. UE 1300 can be configured to use an input device via input/output interface 1305 to allow and/or facilitate a user to capture information into UE 1300. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1309 can be configured to provide a communication interface to RF components such as a transmitter, a receiver, and an antenna. Network connection interface 1311 can be configured to provide a communication interface to network 1343*a*. Network 1343*a* can encompass wired and/or wireless networks such as a local-area network (LAN), a wide-area network (WAN), a computer network, a wireless network, a telecommunications network, another like network or any combination thereof. For example, network 1343*a* can comprise a Wi-Fi network. Network connection interface 1311 can be configured to include a receiver and a transmitter interface used to communicate with one or more other devices over a communication network according to one or more communication protocols, such as Ethernet, TCP/IP, SONET, ATM, or the like. Network connection interface 1311 can implement receiver and transmitter functionality appropriate to the communication network links (e.g., optical, electrical, and the like). The transmitter and receiver functions can share circuit components, software or firmware, or alternatively can be implemented separately.

RAM 1317 can be configured to interface via bus 1302 to processing circuitry 1301 to provide storage or caching of data or computer instructions during the execution of software programs such as the operating system, application programs, and device drivers. ROM 1319 can be configured to provide computer instructions or data to processing circuitry 1301. For example, ROM 1319 can be configured to store invariant low-level system code or data for basic system functions such as basic input and output (I/O), startup, or reception of keystrokes from a keyboard that are stored in a non-volatile memory. Storage medium 1321 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1321 can be configured to include operating system 1323; application program 1325 such as a web browser application, a widget or gadget engine or another application; and data file 1327. Storage medium 1321 can store, for use by UE 1300, any of a variety of various operating systems or combinations of operating systems. For example, application program 1325 can include executable program instructions (also referred to as a computer program product) that, when executed by processor 1301, can configure UE 1300 to perform operations corresponding to various exemplary methods (e.g., procedures) described herein.

Storage medium 1321 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 can allow and/or facilitate UE 1300 to access computer-executable instructions, application programs or the like, stored on transitory or non-transitory memory media, to off-load data, or to upload data. An article of manufacture, such as one utilizing a communication system can be tangibly embodied in storage medium 1321, which can comprise a device readable medium.

In FIG. 14, processing circuitry 1301 can be configured to communicate with network 1343*b* using communication subsystem 1331. Network 1343*a* and network 1343*b* can be the same network or networks or different network or networks. Communication subsystem 1331 can be configured to include one or more transceivers used to communicate with network 1343*b*. For example, communication subsystem 1331 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1333 and/or receiver 1335 to implement transmitter or receiver functionality, respectively, appropriate to the RAN links (e.g., frequency allocations and the like). Further, transmitter 1333 and receiver 1335 of each transceiver can share circuit components, software or firmware, or alternatively can be implemented separately.

In the illustrated embodiment, the communication functions of communication subsystem 1331 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 can include cellular communication, Wi-Fi communication, Bluetooth communication, and GPS communication. Network 1343*b* can encompass wired and/or wireless networks such as a local-area network (LAN), a wide-area network (WAN), a computer network, a wireless network, a telecommunications network, another like network or any combination thereof. For example, network 1343*b* can be a cellular network, a Wi-Fi network, and/or a near-field network. Power source 1313 can be configured to provide alternating current (AC) or direct current (DC) power to components of UE 1300.

The features, benefits and/or functions described herein can be implemented in one of the components of UE 1300 or partitioned across multiple components of UE 1300. Further, the features, benefits, and/or functions described herein can be implemented in any combination of hardware, software or firmware. In one example, communication subsystem 1331 can be configured to include any of the components described herein. Further, processing circuitry 1301 can be configured to communicate with any of such components over bus 1302. In another example, any of such components can be represented by program instructions stored in memory that when executed by processing circuitry 1301 perform the corresponding functions described herein. In another example, the functionality of any of such components can be partitioned between processing circuitry 1301 and communication subsystem 1331. In another example, the non-computationally intensive functions of any of such components can be implemented in software or firmware and the computationally intensive functions can be implemented in hardware.

Figure 15:
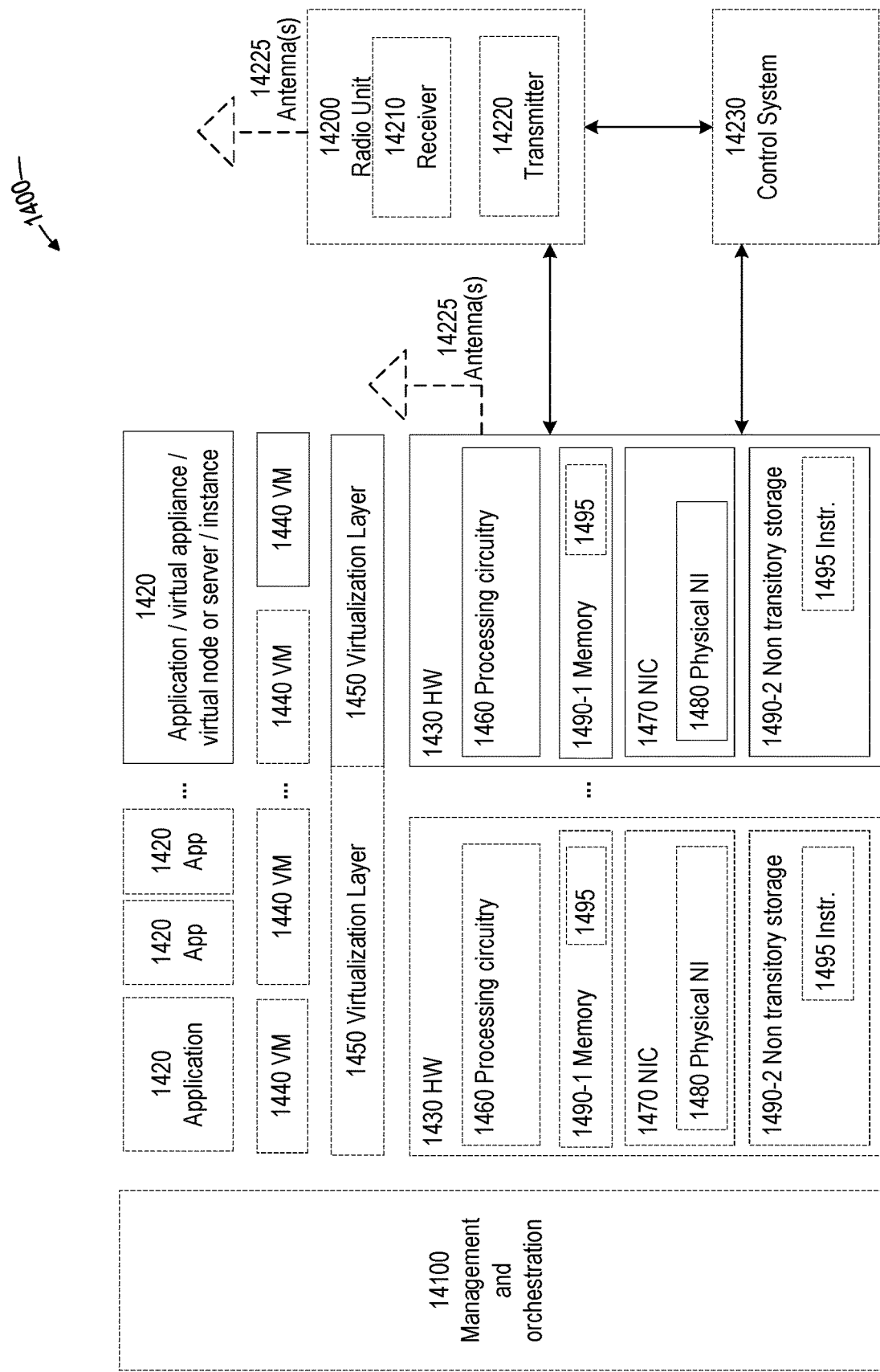
FIG. 15 is a block diagram illustrating an exemplary virtualization environment usable for implementation of various embodiments of network nodes or NFs described herein.

FIG. 15 is a schematic block diagram illustrating a virtualization environment 1400 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node can be entirely virtualized.

The functions can be implemented by one or more applications 1420 (which can alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400 can include general-purpose or special-purpose network hardware devices (or nodes) 1430 comprising a set of one or more processors or processing circuitry 1460, which can be commercial off-the-shelf (COTS) processors, dedicated Application Specific Integrated Circuits (ASICs), or any other type of processing circuitry including digital or analog hardware components or special purpose processors. Each hardware device can comprise memory 1490-1 which can be non-persistent memory for temporarily storing instructions 1495 or software executed by processing circuitry 1460. For example, instructions 1495 can include program instructions (also referred to as a computer program product) that, when executed by processing circuitry 1460, can configure hardware node 1420 to perform operations corresponding to various exemplary methods (e.g., procedures) described herein. Such operations can also be attributed to virtual node(s) 1420 that is/are hosted by hardware node 1430.

Each hardware device can comprise one or more network interface controllers (NICs) 1470, also known as network interface cards, which include physical network interface 1480. Each hardware device can also include non-transitory, persistent, machine-readable storage media 1490-2 having stored therein software 1495 and/or instructions executable by processing circuitry 1460. Software 1495 can include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and can be run by a corresponding virtualization layer 1450 or hypervisor. Different embodiments of the instance of virtual appliance 1420 can be implemented on one or more of virtual machines 1440, and the implementations can be made in different ways.

During operation, processing circuitry 1460 executes software 1495 to instantiate the hypervisor or virtualization layer 1450, which can sometimes be referred to as a virtual machine monitor (VMM). Virtualization layer 1450 can present a virtual operating platform that appears like networking hardware to virtual machine 1440.

As shown in FIG. 15, hardware 1430 can be a standalone network node with generic or specific components. Hardware 1430 can comprise antenna 14225 and can implement some functions via virtualization. Alternatively, hardware 1430 can be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1440 can be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 15.

In some embodiments, one or more radio units 14200 that each include one or more transmitters 14220 and one or more receivers 14210 can be coupled to one or more antennas 14225. Radio units 14200 can communicate directly with hardware nodes 1430 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 14230, which can alternatively be used for communication between the hardware nodes 1430 and radio units 14200.

Furthermore, various network functions (NFs, e.g., DCS, PS, ON functions, AMFs, SMFs, etc.) described herein can be implemented with and/or hosted by different variants of hardware 1430, including those variants described above.

Figure 16:
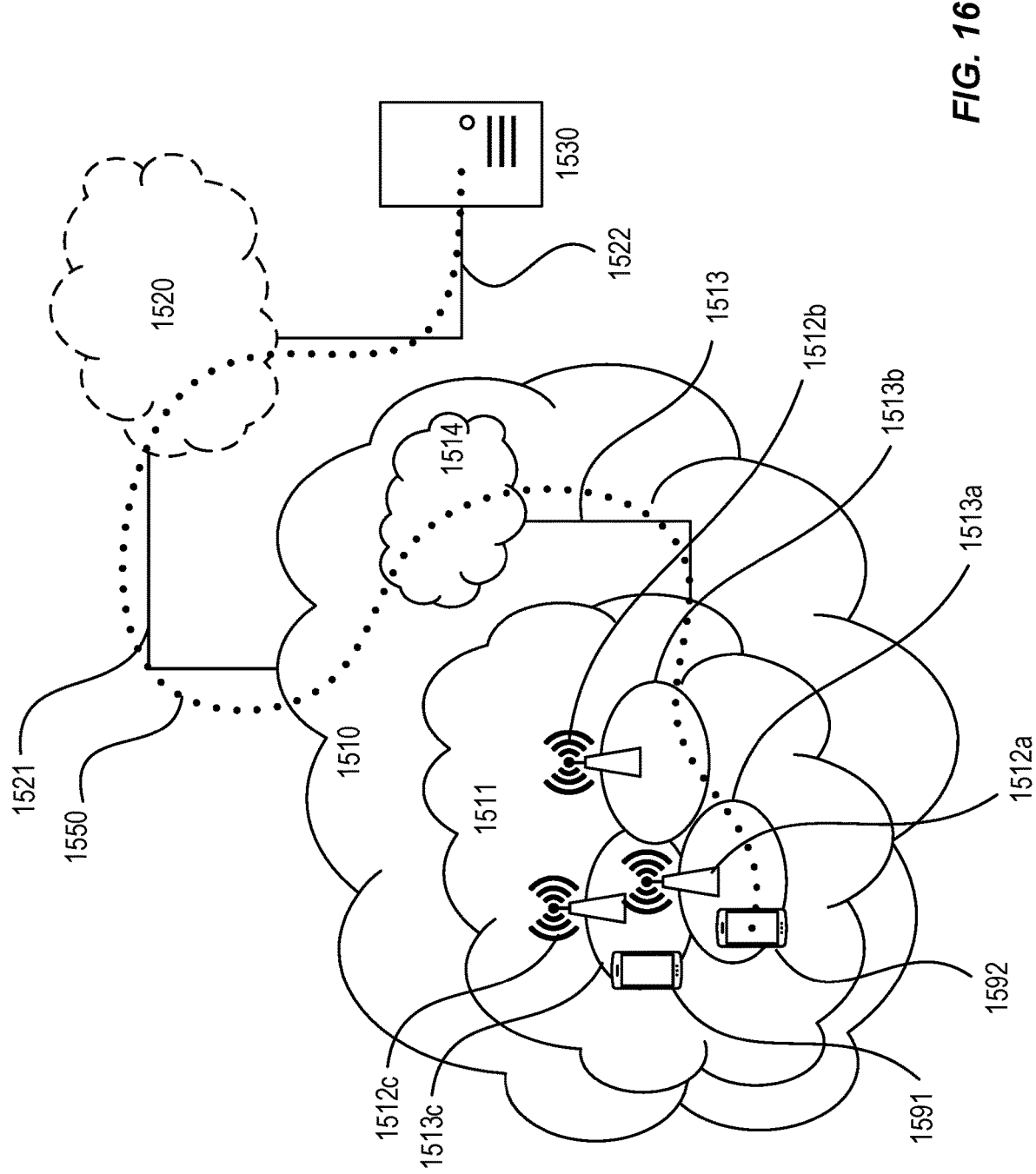
FIGS. 16-17 are block diagrams of various exemplary communication systems and/or networks, according to various exemplary embodiments of the present disclosure.

With reference to FIG. 16, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c can be configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 16 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 17. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 17) served by base station 1620. Communication interface 1626 can be configured to facilitate connection 1660 to host computer 1610. Connection 1660 can be direct, or it can pass through a core network (not shown in FIG. 17) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions.

Base station 1620 also includes software 1621 stored internally or accessible via an external connection. For example, software 1621 can include program instructions (also referred to as a computer program product) that, when executed by processing circuitry 1628, can configure base station 1620 to perform operations corresponding to various exemplary methods (e.g., procedures) described herein.

Communication system 1600 can also include UE 1630 already referred to, whose hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions.

UE 1630 also includes software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides. Software 1631 can also include program instructions (also referred to as a computer program product) that, when executed by processing circuitry 1638, can configure UE 1630 to perform operations corresponding to various exemplary methods (e.g., procedures) described herein.

Figure 17:
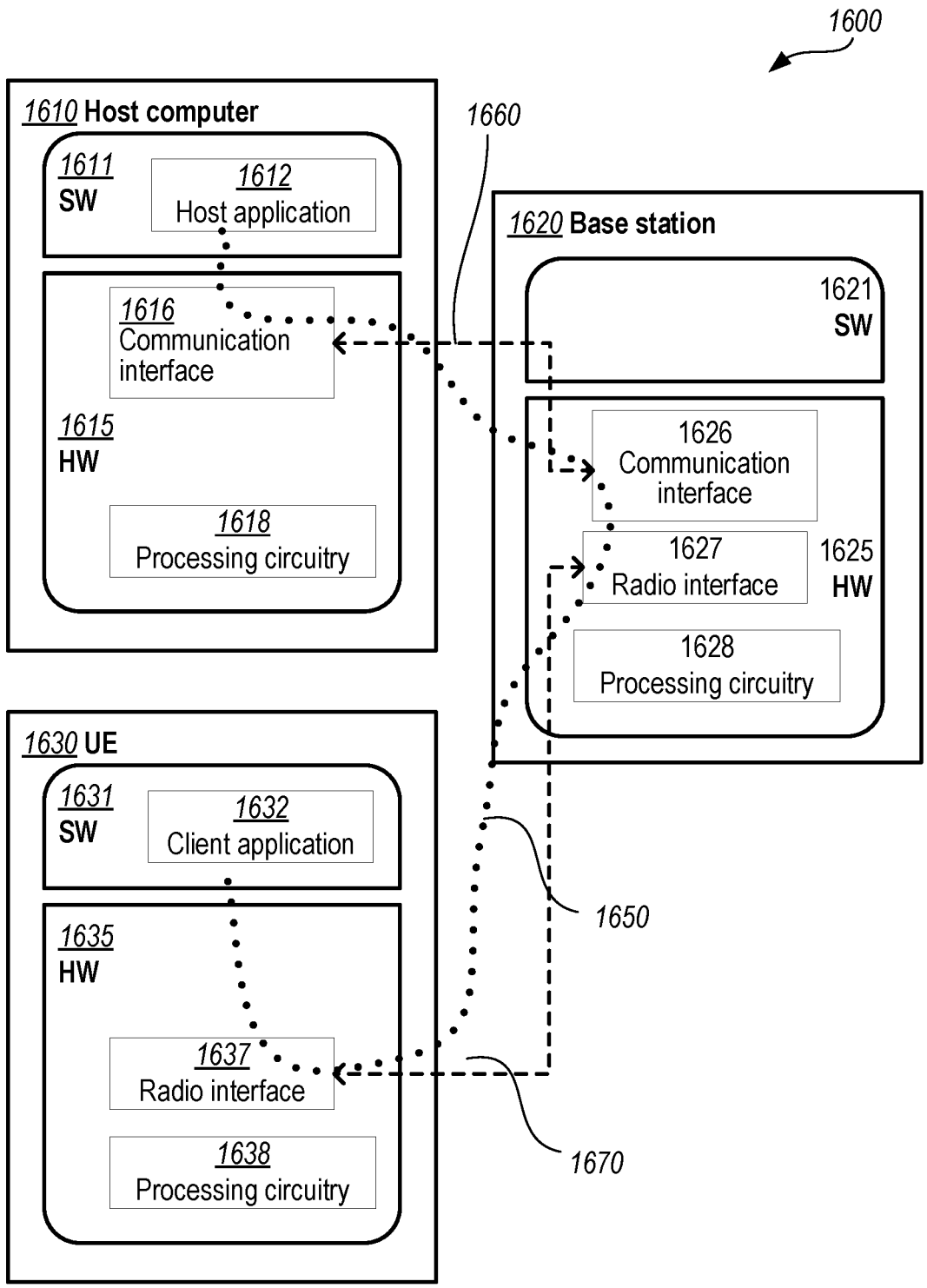

As an example, host computer 1610, base station 1620 and UE 1630 illustrated in FIG. 17 can be similar or identical to host computer 1530, one of base stations 1512*a*, 1512*b*, 1512*c* and one of UEs 1591, 1592 of FIG. 16, respectively. This is to say, the inner workings of these entities can be as shown in FIG. 17 and independently, the surrounding network topology can be that of FIG. 16.

In FIG. 17, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above, or supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors, etc.

Figure 18:
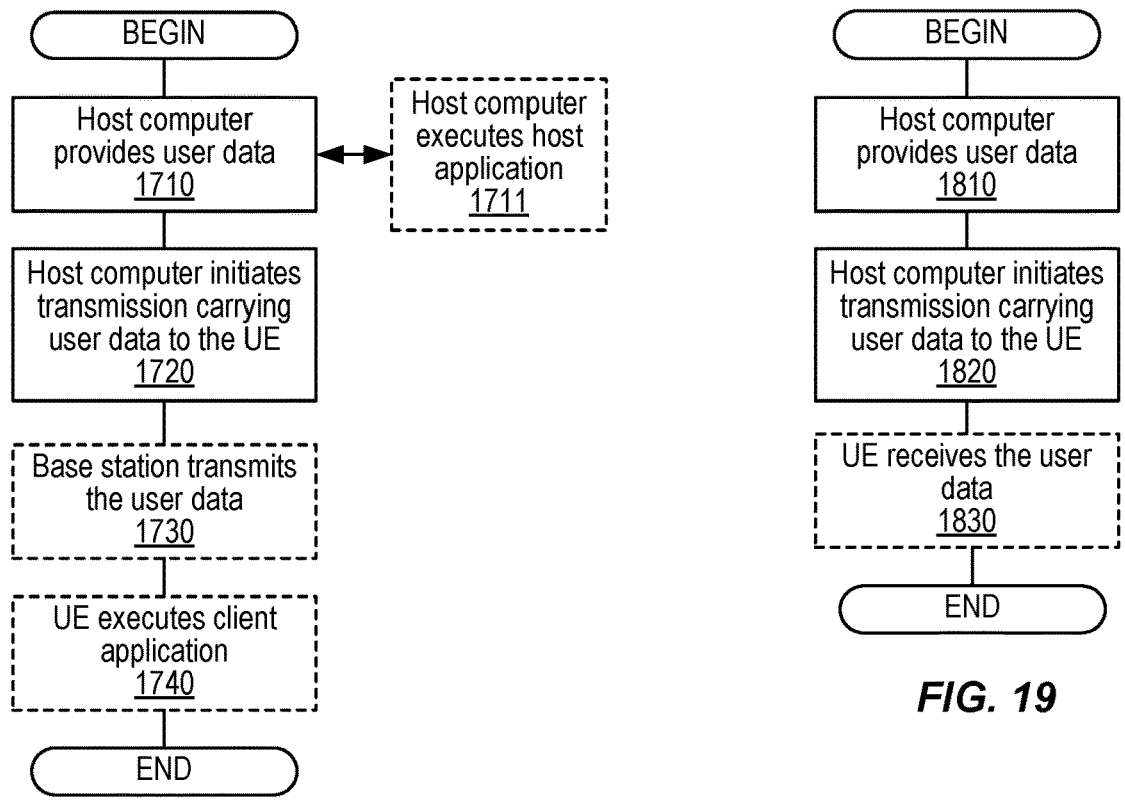
FIGS. 18-21 are flow diagrams of exemplary methods (e.g., procedures) for transmission and/or reception of user data, according to various exemplary embodiments of the present disclosure.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

Figure 19:
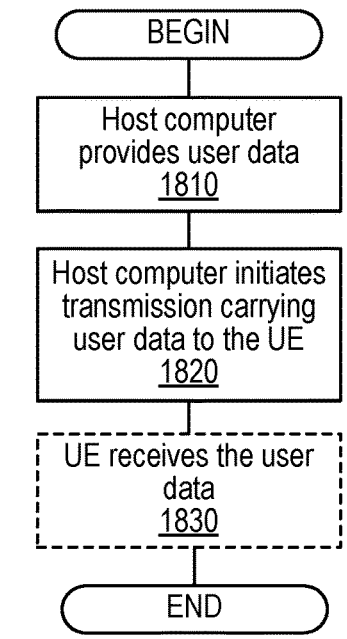

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1810 of the method, the host computer provides user data. In an optional substep (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

Figure 20:
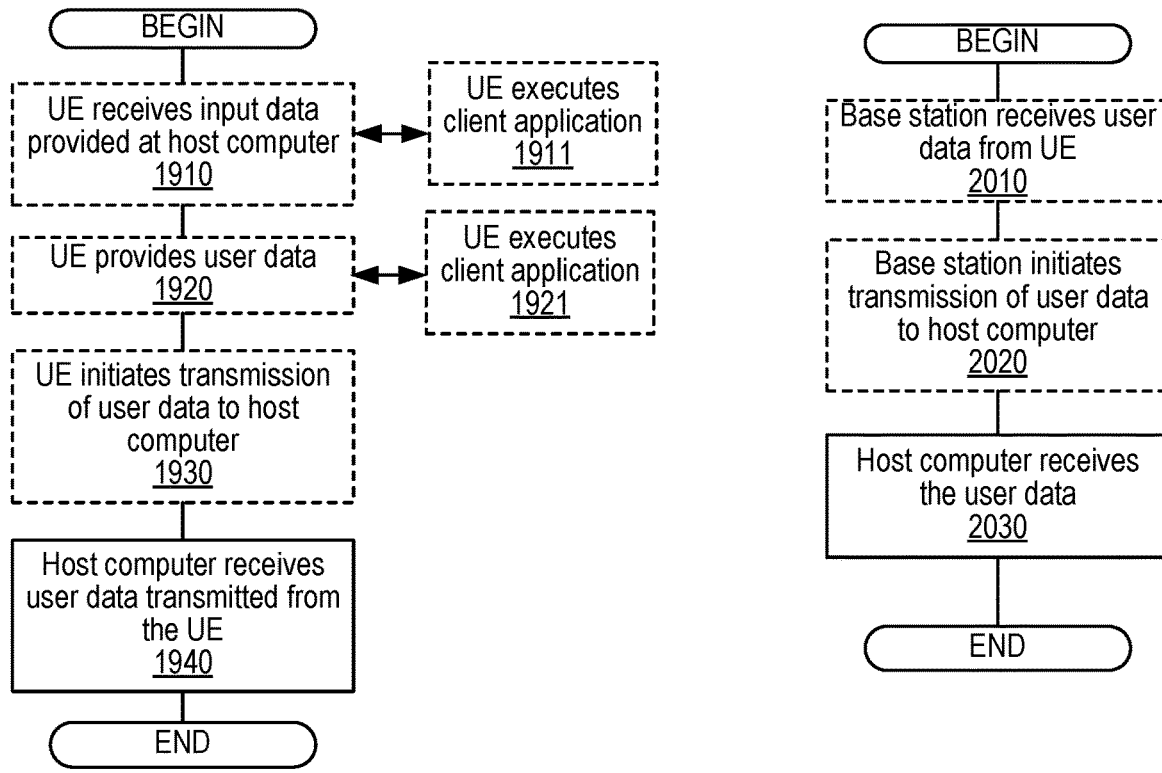

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

Figure 21:
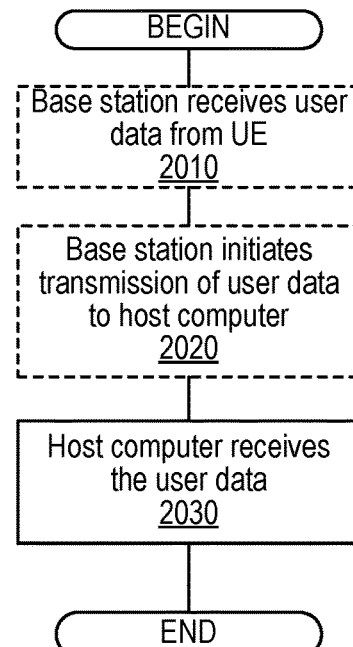

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

A1. A method for a user equipment (UE) to obtain security credentials for accessing a non-public network (NPN), the method comprising:
sending, to an onboarding network (ON), a registration request that includes an identifier of the UE;
obtaining an indication of a credential provisioning protocol (CPP) used by a provisioning server (PS) for provisioning security credentials to access the NPN; and
obtaining, from the PS via the ON using the indicated CPP, security credentials for the UE to access the NPN.

A2. The method of embodiment A1, further comprising:
deregistering from the ON; and
registering with the NPN using the obtained security credentials.

A3. The method of any of embodiments A1-A2, wherein:
the registration request includes an indication of one or more UE-supported CPPs; and
the indicated CPP is one of the UE-supported CPPs.

A4. The method of any of embodiments A1-A3, wherein the received indication is integrity-protected based on key material known to the UE and the PS.

A5. The method of any of embodiments A1-A4, wherein the indication of the CPP used by the PS is obtained from the ON.

A6. The method of embodiment A5, wherein the indication is obtained from the ON in one of the following:
a message in a non-access stratum security mode command (NAS SMC) procedure; or
a registration accept that is responsive to the registration request.

A7. The method of any of embodiments A1-A4, wherein the indication is obtained from the PS.

A8. The method of embodiment A7, wherein obtaining the indication further comprises:
after registration with the ON, sending, to the PS, a request for security credentials for the UE to access the NPN; and
receiving the indication in response to the request.

A9. The method of any of embodiments A1-A8, wherein the indicated CPP is one of the following: CMPv2, ACME, EST, SCEP, GSMA eSIM, or OMA LwM2M.

A10. The method of any of embodiments A1-A9, wherein the indication of the CPP includes an indication of whether the CPP is performed via control plane or user plane communications with the UE.

B1. A method for an onboarding network (ON) to facilitate provisioning of security credentials for a user equipment (UE) to access a non-public network (NPN), the method comprising:
receiving, from the UE, a registration request that includes an identifier of the UE;
obtaining an indication of a credential provisioning protocol (CPP) used by a provisioning server (PS) for provisioning security credentials to access the NPN; and
sending the indication of the CPP to the UE.

B2. The method of embodiment B1, wherein the indication is sent to the UE in one of the following:
a message in a non-access stratum security mode command (NAS SMC) procedure; or
a registration accept that is responsive to the registration request.

B3. The method of any of embodiments B1-B2, wherein the indication sent to the UE is integrity-protected based on key material known to the UE and the PS.

B4. The method of any of embodiments B1-B3, wherein obtaining the indication comprises selecting the CPP based on one or more of the following:
- a predetermined CPP, configured in the ON;
- a CPP selection policy, configured in the ON;
- an indication of one or more UE-supported CPPs, included in the registration request; and
- an indication of one or more PS-supported CPPs, received from the PS or from a default credential server (DCS).

B5. The method of any of embodiments B1-B3, wherein obtaining the indication comprises receiving the indication from a default credential server (DCS) or from the PS.

B6. The method of embodiment B5, wherein the received indication is integrity-protected based on key material known to the UE and the PS.

B7. The method of any of embodiments B5-B6, wherein:
- obtaining the indication further comprises sending, to the PS or to the DCS, a request for an indication of a CPP used by the PS; and
- the indication is received from the PS or from the DCS in response to the request.

B8. The method of embodiment B7, wherein
- the registration request includes an indication of one or more UE-supported CPPs;
- the request to the PS or to the DCS also includes the indication of the one or more UE-supported CPPs; and
- the CPP indicated in the response to the request is one of the UE-supported CPPs.

B9. The method of any of embodiments B1-B8, further comprising deregistering the UE after sending the indication of the CPP.

B10. The method of any of embodiments B1-B9, wherein the indicated CPP is one of the following: CMPv2, ACME, EST, SCEP, GSMA eSIM, or OMA LwM2M.

B11. The method of any of embodiments B1-B10, wherein the indication obtained and sent to the UE includes an indication of whether the CPP is performed via control plane or user plane communications with the UE.

C1. A method for a default credential server (DCS) to facilitate provisioning of security credentials for a user equipment (UE) to access a non-public network (NPN), the method comprising:
- receiving, from an onboarding network (ON), an authentication request that includes an identifier of the UE;
- performing a primary authentication with the UE via the ON, using an authentication method based on the identifier of the UE;
- determining a credential provisioning protocol (CPP) used by a provisioning server (PS) for provisioning security credentials to access the NPN; and
- sending an indication of the CPP to the ON.

C2. The method of embodiment C1, wherein the indication sent to the ON is integrity-protected based on key material known to the UE and the PS.

C3. The method of any of embodiments C1-C2, wherein determining the CPP comprises selecting the CPP based on one or more of the following:
- a predetermined CPP, configured in the DCS;
- a CPP selection policy, configured in the DCS;
- an indication of one or more UE-supported CPPs, included in the authentication request; and
- an indication of one or more PS-supported CPPs, received from the PS.

C4. The method of any of embodiments C1-C2, wherein determining the CPP comprises:
- sending, to the PS, a request for an indication of a CPP used by the PS; and
- receiving the indication from the PS in response to the request.

C5. The method of embodiment C4, wherein
- the authentication request includes an indication of one or more UE-supported CPPs;
- the request to the PS also includes the indication of the one or more UE-supported CPPs; and
- the CPP indicated in the response to the request is one of the UE-supported CPPs.

C6. The method of any of embodiments C1-C5, wherein the indicated CPP is one of the following: CMPv2, ACME, EST, SCEP, GSMA eSIM, or OMA LwM2M.

C7. The method of any of embodiments C1-C6, wherein the indication sent to the ON includes an indication of whether the CPP is performed via control plane or user plane communications with the UE.

D1. A method, by a provisioning server (PS) for a non-public network (NPN), to facilitate user equipment (UE) access to the NPN, the method comprising:
- determining a credential provisioning protocol (CPP) to be used by the PS for provisioning security credentials for the UE to access the NPN;
- sending an indication of the CPP to the UE; and
- providing, to the UE via an onboarding network (ON) using the indicated CPP, security credentials for the UE to access the NPN.

D2. The method of embodiment D1, wherein:
- the method further comprises receiving, from the UE, a request for security credentials for the UE to access the NPN; and
- the indication is sent in response to the request.

D3. The method of any of embodiments D1-D2, wherein the indication is integrity-protected based on key material known to the UE and the PS.

D4. The method of any of embodiments D1-D3, wherein determining the CPP comprises selecting the CPP based on one or more of the following:
- a predetermined CPP, configured in the PS;
- a CPP selection policy, configured in the PS;
- an indication of one or more UE-supported CPPs, included in a request received from the UE;
- one or more ON-supported CPPs, as indicated by the ON; and
- one or more CPPs supported by a default credentials server (DCS), as indicated by the DCS.

D5. The method of any of embodiments D1-D4, wherein the indicated CPP is one of the following: CMPv2, ACME, EST, SCEP, GSMA eSIM, or OMA LwM2M.

D6. The method of any of embodiments D1-D5, wherein the indication sent to the ON includes an indication of whether the CPP is performed via control plane or user plane communications with the UE.

E1. A user equipment (UE) configured to obtain security credentials for accessing a non-public network (NPN), the UE comprising:
- radio interface circuitry configured to communicate with an onboarding network (ON) and the NPN; and
- processing circuitry operably coupled to the radio interface circuitry, whereby the processing circuitry and radio interface circuitry are configured to perform operations corresponding to any of the methods of embodiments A1-A10.

E2. A user equipment (UE) configured to obtain security credentials for accessing a non-public network (NPN), the UE being further configured to perform operations corresponding to any of the methods of embodiments A1-A10.

E3. A non-transitory, computer-readable medium storing computer-executable instructions that, when executed by processing circuitry of a user equipment (UE) configured to obtain security credentials for accessing a non-public network (NPN), configure the UE to perform operations corresponding to any of the methods of embodiments A1-A10.

E4. A computer program product comprising computer-executable instructions that, when executed by processing circuitry of a user equipment (UE) configured to obtain security credentials for accessing a non-public network (NPN), configure the UE to perform operations corresponding to any of the methods of embodiments A1-A10.

F1. An onboarding network (ON) configured to facilitate provisioning of security credentials for a user equipment (UE) to access a non-public network (NPN), the ON including one of more network nodes or functions that comprise:
  interface circuitry configured to communicate at least with the UE and a default credential server (DCS); and
  processing circuitry operably coupled to the interface circuitry, whereby the processing circuitry and interface circuitry are configured to perform operations corresponding to any of the methods of embodiments B1-B11.

F2. An onboarding network (ON) configured to facilitate provisioning of security credentials for a user equipment (UE) to access a non-public network (NPN), the ON including one of more network nodes or functions that are configured to perform operations corresponding to any of the methods of embodiments B1-B11.

F3. A non-transitory, computer-readable medium storing computer-executable instructions that, when executed by processing circuitry associated with an onboarding network (ON) configured to facilitate provisioning of security credentials for a user equipment (UE) to access a non-public network (NPN), configure the ON to perform operations corresponding to any of the methods of embodiments B1-B11.

F4. A computer program product comprising computer-executable instructions that, when executed by processing circuitry associated with an onboarding network (ON) configured to facilitate provisioning of security credentials for a user equipment (UE) to access a non-public network (NPN), configure the ON to perform operations corresponding to any of the methods of embodiments B1-B11.

G1. A default credential server (DCS) configured to facilitate provisioning of security credentials for a user equipment (UE) to access a non-public network (NPN), the DCS comprising:
  interface circuitry configured to communicate at least with an onboarding network (ON) and the UE; and
  processing circuitry operably coupled to the interface circuitry, whereby the processing circuitry and interface circuitry are configured to perform operations corresponding to any of the methods of embodiments C1-C7.

G2. A default credential server (DCS) configured to facilitate provisioning of security credentials for a user equipment (UE) to access a non-public network (NPN), the DCS being further configured to perform operations corresponding to any of the methods of embodiments C1-C7.

G3. A non-transitory, computer-readable medium storing computer-executable instructions that, when executed by processing circuitry associated with a default credential server (DCS) configured to facilitate provisioning of security credentials for a user equipment (UE) to access a non-public network (NPN), configure the DCS to perform operations corresponding to any of the methods of embodiments C1-C7.

G4. A computer program product comprising computer-executable instructions that, when executed by processing circuitry associated with a default credential server (DCS) configured to facilitate provisioning of security credentials for a user equipment (UE) to access a non-public network (NPN), configure the DCS to perform operations corresponding to any of the methods of embodiments C1-C7.

H1. A provisioning server (PS) configured to facilitate user equipment (UE) access to a non-public network (NPN), the PS comprising:
  interface circuitry configured to communicate at least with an onboarding network (ON) and the UE; and
  processing circuitry operably coupled to the interface circuitry, whereby the processing circuitry and interface circuitry are configured to perform operations corresponding to any of the methods of embodiments D1-D6.

H2. A provisioning server (PS) configured to facilitate user equipment (UE) access to a non-public network (NPN), the PS being further configured to perform operations corresponding to any of the methods of embodiments D1-D6.

H3. A non-transitory, computer-readable medium storing computer-executable instructions that, when executed by processing circuitry associated with a provisioning server (PS) configured to facilitate user equipment (UE) access to a non-public network (NPN), configure the PS to perform operations corresponding to any of the methods of embodiments D1-D6.

H4. A computer program product comprising computer-executable instructions that, when executed by processing circuitry associated with a provisioning server (PS) configured to facilitate user equipment (UE) access to a non-public network (NPN), configure the PS to perform operations corresponding to any of the methods of embodiments D1-D6.

The invention claimed is:

1. A method for a user equipment (UE) to obtain security credentials for accessing a non-public network (NPN), the method comprising:
  sending, to an onboarding network (ON), a registration request that includes an identifier of the UE;
  obtaining an indication of a credential provisioning protocol (CPP) used by a provisioning server (PS) for provisioning security credentials to access the NPN; and
  obtaining security credentials for the UE to access the NPN, wherein the security credentials are obtained from the PS via the ON using the indicated CPP.

2. The method of any of claim 1, wherein:
  the registration request includes an indication of one or more UE-supported CPPs; and
  the indicated CPP is one of the UE-supported CPPs.

3. The method of claim 1, wherein obtaining the indication of a CPP used by the PS includes receiving an indication of a PS-supported CPP from the PS or from a default credential server (DCS).

4. The method according to claim 1, wherein the DCS comprises an authentication, authorization, and accounting (AAA) server.

5. The method of claim 1, wherein the obtained indication is integrity-protected based on one of the following:
- key material known to the UE and to a default credential server (DCS),
- key material known to the UE and to the PS, or
- key material known to the UE and to the ON.

6. The method of claim 1, wherein the indication of the CPP used by the PS is obtained from the ON.

7. The method of claim 6, wherein the indication of the CPP used by the PS is obtained from the ON in one of the following:
- a message in a non-access stratum security mode command (NAS SMC) procedure; or
- a registration accept that is responsive to the registration request.

8. The method of claim 1, wherein the indication of the CPP used by the PS is obtained from the PS.

9. The method of claim 8, wherein obtaining the indication of the CPP used by the PS comprises:
- after registration with the ON, sending to the PS a request for security credentials for the UE to access the NPN; and
- receiving the indication in response to the request.

10. The method of claim 1, wherein the indicated CPP is one of the following: CMPv2, ACME, EST, SCEP, GSMA eSIM, or OMA LwM2M.

11. The method of claim 1, wherein the indication of the CPP used by the PS includes an indication of whether the CPP is performed via control plane communications with the UE or via user plane communications with the UE.

12. A method for a default credential server (DCS) to facilitate provisioning of security credentials for a user equipment (UE) to access a non-public network (NPN), the method comprising:
- receiving, from an onboarding network (ON), an authentication request that includes an identifier of the UE;
- performing a primary authentication with the UE via the ON, using an authentication method based on the identifier of the UE;
- determining a credential provisioning protocol (CPP) used by a provisioning server (PS) for provisioning security credentials to access the NPN; and
- sending to the ON an indication of the CPP used by the PS.

13. A method for a provisioning server (PS) for a non-public network (NPN) to facilitate user equipment (UE) access to the NPN, the method comprising:
- determining a credential provisioning protocol (CPP) to be used by the PS for provisioning security credentials for the UE to access the NPN;
- sending to the UE an indication of the CPP to be used by the PS; and
- providing security credentials for the UE to access the NPN, wherein the security credentials are provided to the UE via an onboarding network (ON) using the indicated CPP.

14. A user equipment (UE) configured to obtain security credentials for accessing a non-public network (NPN), the UE comprising:
- radio interface circuitry configured to communicate with an onboarding network (ON) and the NPN; and
- processing circuitry operably coupled to the radio interface circuitry, whereby the processing circuitry and radio interface circuitry are configured to perform operations corresponding to method of claim 1.

15. A non-transitory, computer-readable medium storing computer-executable instructions that, when executed by processing circuitry of a user equipment (UE) configured to obtain security credentials for accessing a non-public network (NPN), configure the UE to perform operations corresponding to the method of claim 1.

16. A default credential server (DCS) configured to facilitate provisioning of security credentials for a user equipment (UE) to access a non-public network (NPN), the DCS comprising:
- interface circuitry configured to communicate at least win an onboarding network (ON) and the UE; and
- processing circuitry operably coupled to the interface circuitry, wherein the processing circuitry and the interface circuitry are configured to perform operations corresponding to the method of claim 12.

17. A non-transitory, computer-readable medium storing computer-executable instructions that, when executed by processing circuitry of a default credential server (DCS) configured to facilitate provisioning of security credentials for a user equipment (UE) to access a non-public network (NPN), configure the DCS to perform operations corresponding to the method of claim 12.

18. A provisioning server (PS) configured to facilitate user equipment (UE) access to a non-public network (NPN), the DCS comprising:
- interface circuitry configured to communicate with at least an onboarding network (ON) and the UE; and
- processing circuitry operably coupled to the interface circuitry, wherein the processing circuitry and the interface circuitry are configured to perform operations corresponding to the method of claim 13.

19. A non-transitory, computer-readable medium storing computer-executable instructions that, when executed by processing circuitry of a provisioning server (PS) configured to facilitate user equipment (UE) access to a non-public network (NPN), configure the PS to perform operations corresponding to the method of claim 13.

* * * * *